United States Patent
Sasaki et al.

(10) Patent No.: US 6,554,093 B2
(45) Date of Patent: Apr. 29, 2003

(54) VEHICULAR HOOD DEVICE

(75) Inventors: Sakae Sasaki, Wako (JP); Kaoru Nagatomi, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/907,310

(22) Filed: Jul. 17, 2001

(65) Prior Publication Data

US 2002/0011365 A1 Jan. 31, 2002

(30) Foreign Application Priority Data

| Jul. 19, 2000 | (JP) | 2000-219347 |
|---|---|---|
| Jul. 25, 2000 | (JP) | 2000-223667 |
| Jul. 25, 2000 | (JP) | 2000-223687 |
| Jul. 27, 2000 | (JP) | 2000-227895 |

(51) Int. Cl.$^7$ ............................................. B60R 21/34
(52) U.S. Cl. ...................... 180/274; 180/68.21; 16/371; 16/374
(58) Field of Search .................. 180/69.21, 274, 180/281; 296/194, 189; 16/222, 371, 374

(56) References Cited

U.S. PATENT DOCUMENTS

| 3,009,192 | A | * | 11/1961 | Fiedler et al. ................. 16/288 |
|---|---|---|---|---|
| 4,382,312 | A | * | 5/1983 | Liggett et al. ................. 16/288 |
| 4,727,621 | A | * | 3/1988 | Emery et al. ................. 16/239 |
| 5,697,467 | A | * | 12/1997 | Howard ........................ 16/222 |
| 6,182,782 | B1 | * | 2/2001 | Matsuura et al. ........... 180/274 |
| 6,217,108 | B1 | | 4/2001 | Sasaki |
| 6,237,992 | B1 | * | 5/2001 | Howard ....................... 180/271 |
| 6,257,657 | B1 | | 7/2001 | Sasaki |
| 6,293,362 | B1 | * | 9/2001 | Sasaki et al. ................ 180/274 |
| 6,330,734 | B1 | * | 12/2001 | Cho ............................. 16/222 |

FOREIGN PATENT DOCUMENTS

| DE | 39 17 967 | A1 | * | 8/1990 |
|---|---|---|---|---|
| DE | 694 00 889 | | | 3/1997 |
| DE | 197 12 961 | A1 | * | 10/1998 |
| DE | 100 33 148 | | | 3/2001 |
| DE | 100 35 105 | | | 6/2001 |
| EP | 0 630 801 | | | 11/1996 |
| GB | 2 354 797 | A | * | 4/2001 |
| JP | 8-99652 | A | * | 4/1996 |
| JP | 9-177419 | A | * | 7/1997 |
| JP | 9-315266 | | | 12/1997 |
| JP | 10-258774 | | | 9/1998 |
| JP | 11-20740 | A | * | 1/1999 |
| JP | 11-020741 | A | * | 1/1999 |
| JP | 11-99906 | A | * | 4/1999 |
| JP | 11-310157 | | | 9/1999 |
| JP | 2000-203377 | A | * | 7/2000 |
| WO | WO 97/10404 | A1 | * | 3/1997 |

\* cited by examiner

Primary Examiner—Paul N. Dickson
Assistant Examiner—Ruth Ilan
(74) Attorney, Agent, or Firm—Merchant & Gould P.C.

(57) ABSTRACT

A vehicular hood device has a hinge serving also as a coupling link mechanism. The hinge in a usual time allows a hood to make opening and closing movements about a hinge pin connecting a second link to the hood. When an obstacle collided with the vehicle to lift the hood by an actuator, the hinge enables the extended first and second links to determine a hood raise position. The hinge includes a stopper pawl. The stopper pawl has rigidity designed to be deformable by operation of the actuator but not to be bent by a usual hood opening and closing force, thus preventing the hood from floating during normal operation.

28 Claims, 26 Drawing Sheets

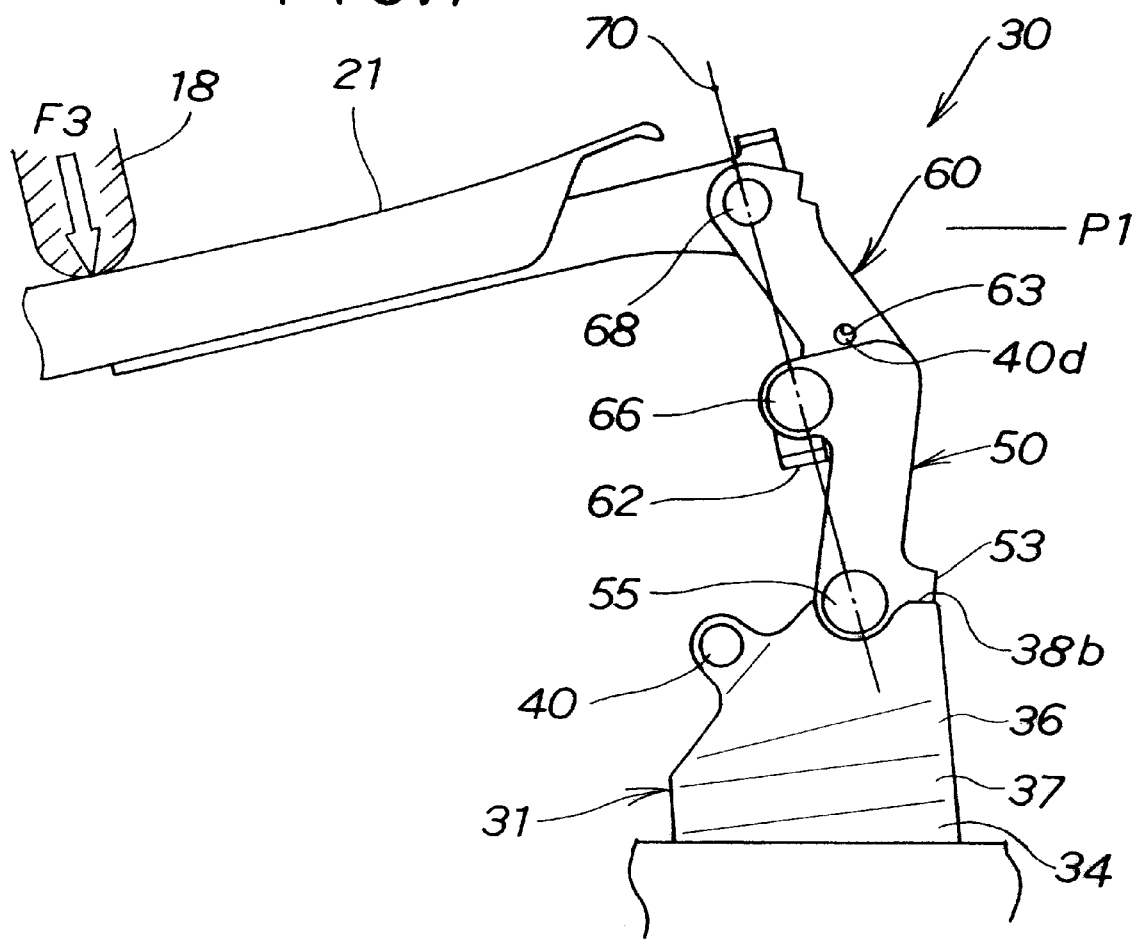

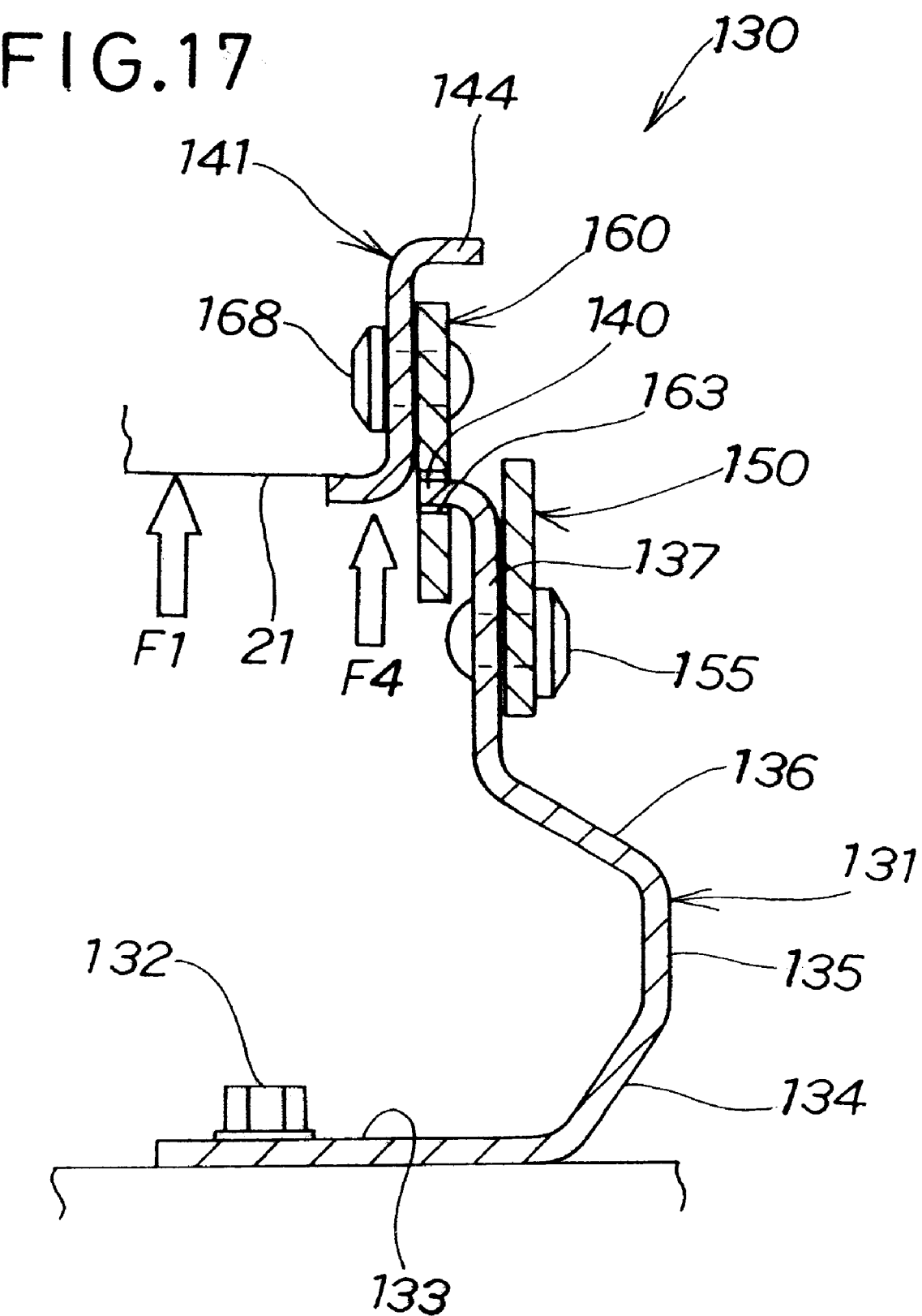

VEHICULAR HOOD DEVICE

BACKGROUND OF THE INVENTION

1. Field of the Invention

The present invention relates generally to vehicular hood devices and, more particularly, to a vehicular hood device designed to lift a hood to enable sufficient deformation of the hood for impact absorption.

2. Description of the Related Art

Known vehicular hood devices include those designed to lift a hood by a predetermined amount and hold it at the lifted position when a traveling vehicle collides with an obstacle. The lift of the hood increases the downward deformable amount, thereby making it possible to increase the amount of energy absorption upon collision. An example of such a vehicular hood device is disclosed in Japanese Patent Laid-Open Publication No. HEI-10-258774 entitled "JUMP-UP HOOD". This example hood device will be explained with reference to FIG. 25 hereof.

In FIG. 25, the conventional hood device 200 is shown in its closed state. The vehicular hood device 200 includes a bracket 202 mounted on the vehicular body 201, a guide hole 202a formed in the bracket 202, a link 205 having a lower end attached in the guide hole 202a through a lower pin 203, and a hood arm 207 to which an upper end of the link 205 is coupled through an upper pin 206.

The bracket 202 is attached to a lock piece 211 via a fixing pin 210. A tension spring 214 is hooked to the lock piece 211 so that a pawl 212 of the lock piece 211 is pressed on the upper pin 206.

This holds the upper pin 206 in a U-groove 202b of the bracket 202 thereby preventing the link 205 from rising. By the prevention against rise in the link 205, the hood 208 in the usual time can be prevented from floating and hence chattering of the hood 208.

Meanwhile, in the event the vehicle collide with an obstacle, the pawl 212 of the lock piece 211 is disengaged from the upper pin 206 to make free the link 205 thereby making it possible to lift the hood 208 up to a predetermined rise position. With reference to the next figure, explanation is made on the example to lift the hood 208.

Reference is made next to FIG. 26 showing the conventional vehicular hood device 200 in a state of raising the hood 208. When the vehicle collides with an obstacle, an actuator (not shown) operates to apply a lift force to the hood 208. Simultaneously, an unlock force F is applied to the lock piece 211 as shown at an arrow, to rotate the lock piece 211 about the fixing pin 210 as shown at an arrow (a). The pawl 212 of the lock piece 211 is disengaged from the upper pin 206 to make free the link 205.

Due to this, the upper pin 206 rises matched to the hood 208 as shown at the arrow (b) while the lower pin 203 moves along the guide hole 202a as shown at an arrow (c). As a result, the hood 208 is lifted by a predetermined amount to increase the downward deformable amount of the hood 208 and hence the absorption amount of collision energy.

However, in order to eliminate the chatter of the hood 208 in the usual time, the upper pin 206 must be locked by the pawl 212 of the lock piece 211. Thus, required are the lock piece 211 as well as the tension spring 214 to hold the lock piece 211 in its lock position.

In order to lift the hood 208 upon collision of the vehicle, the lock piece 211 in the lock position must be operated to an unlock position. For this reason, there is a need for an operation mechanism to operate the lock piece 211 into an unlock state.

Accordingly, there is increase in the number of parts for the vehicular hood device 200. This in turn constitutes a factor of mount-up of cost.

In the meanwhile, generally, there are cases for a vehicle, such as an automobile, where the hood is opened in the usual state in order for maintenance or inspection in the engine compartment. In the vehicular hood device 200, when the hood 208 is opened, there is a necessity of keeping the upper pin 206 in a state held in the U-groove 202b of the bracket 202. In this state, a hood lock mechanism (not shown) at the front of the hood 208 is operated to release the locking and open the hood 208 about the upper pin 206 as an axis as shown at an arrow. This allows for engine compartment maintenance and inspection.

Herein, in order to conduct engine compartment maintenance and inspection, the hood 208 in opening is halted in a predetermined position and the hood 208 is restricted in opening not to be opened furthermore. For restricting the opening of the hood 208, there is a need to provide hood opening-prevention means as an exclusive member. This however results in hindrance to the size and weight reduction in the vehicular hood device 200.

In addition, there is known as a vehicular hood device of this kind, for example, a "vehicular hood device" in Japanese Patent Laid-open No. 315266/1997, the art of which will be explained in the next figure.

In FIG. 27A, when the vehicle collides against an obstacle, the rod 301 of the actuator 300 starts to rise as shown at an arrow. The rod 301 is attached to rod holding means 302 (stopper piece 303, compression spring 304 and holding piece 305) wherein the stopper piece 303 is extended outside of the rod 301 by the compression spring 304.

In FIG. 27B, the rod 301 is further raised so that the stopper piece 303 abuts against a housing 300a of the actuator 300 and the stopper piece 303 enters a groove 306 of the rod 301.

In FIG. 27C, the rod 301 is projected to its upper limit to lift the hood (not shown) by a predetermined amount. Simultaneously, the stopper piece 303 gets over the housing 300a of the actuator 300, and the stopper piece 303 extends from the groove 306 to the outside of the rod 301.

Due to this, the stopper piece 303 abuts against a surface of the housing 300a to hold the rod 301 at the upper limit, thereby holding the hood at a position lifted by a predetermined amount.

However, in order to hold the hood in the position lifted by a predetermined amount, the rod holding means 302 must be structured by the stopper piece 303, the compression spring 304 and the holding piece 305 to assemble the stopper piece 303, the compression spring 304 and the holding piece 305 in the groove 306 of the rod 301. This accordingly complicates the structure of the vehicular hood device.

Meanwhile, because the rod 301 is comparatively thin, it takes time to form a groove 306 in the thin rod 301 or assemble the stopper piece 303, compression spring 304 and holding piece 305 in the groove 306. Accordingly, it is difficult to enhance the producibility of the vehicular hood devices, which raises a factor of cost increase.

On the other hand, it is to be considered that, when the vehicle collides with an obstacle to lift the hood at its rear part by a predetermined amount, an urge force be acted upon the hood in a direction of from the front to rear of the vehicle. In this case, there is a fear of moving of the hood because the rear part thereof is in float. For this reason, there is a fear that the hood at the rear part nears toward the front windshield by a required amount or more. It is desired to provide a structure not to near the rear part of the hood toward the front windshield by a required amount or more.

With such a structure, the vehicular hood device is further complicated in structure resulting in a factor of mount-up of cost.

SUMMARY OF THE INVENTION

It is therefore an object of the present invention to provide a vehicular hood device which is capable of reducing a number of parts and suppressing the increase in cost.

Another object of the present invention is to provide a vehicular hood device reduced in size and weight.

Still another object of the present invention is to provide a vehicular hood device which is capable of holding the hood at a lifted position by a simple structure and preventing the lifted hood from approaching the windshield beyond a predetermined amount by a simple structure.

According to a first aspect of the present invention, there is provided A vehicular hood device comprising a first link attached swingably to a bracket on a vehicle via a pin, a second link attached swingably to the first link through a coupling pin and a hood provided at a front part of the vehicle and attached to the second link via a hinge pin, the hood being normally capable of opening and closing actions about the hinge pin with the first and second links folded, the hood being designed to be lifted upon collision of the vehicle with an obstacle, by an action of an actuator, the first and second links being extendible upon the collision to determine a raise position of the hood, characterized in that it further comprises: a stopper pin for connecting the second link to the bracket with the first and second links folded, the stopper pin having strength set not to be cut during the opening and closing actions of the hood but to be cut upon operation of said actuator.

By connecting the second link to the bracket by the stopper pin, the hood in a usual situation is prevented from floating. The mere provision of the stopper pin can prevent chattering due to floating of the hood. Consequently, because the chattering due to hood floating can be prevented by a simple structure, the number of parts can be reduced.

The prior art requires lock release by an operation mechanism when extending the coupled link. Due to this, an operation mechanism is required as an exclusive member for lock release thus increasing the number of parts. In contrast, the present invention, when the actuator is operated, cuts the stopper pin by a lift force thereof to release the lock, thus eliminating the necessity of a special operation mechanism for releasing the lock. Accordingly, the number of parts can be reduced furthermore.

According to a second aspect of the invention, there is provided a vehicular hood device comprising a first link attached swingably to a bracket on a vehicle via a pin, a second link attached swingably to the first link via a coupling pin, and a hood provided at a front part of the vehicle and attached to the second link via a hinge pin, the hood being normally capable of opening and closing actions about the hinge pin with the first and second links folded, the hood being designed to be lifted, upon collision of the vehicle with an obstacle, by an action of an actuator, the first and second links being extendible upon the collision to determine a raised position of the hood, characterized in that it further comprises: a stopper pawl for coupling the second link to the bracket with the first and second links folded, the stopper pawl having rigidity being set to maintain the coupling during the opening and closing actions of the hood and to release the coupling upon operation of the actuator.

By connecting the second link to the bracket by the stopper pawl, the hood in a usual situation is prevented from floating. The mere provision of the stopper pawl can prevent chattering due to floating of the hood. Consequently, because the chattering due to hood floating can be prevented by a simple structure, the number of parts can be reduced.

The prior art requires lock release by an operation mechanism when extending the coupled link. Due to this, an operation mechanism is required as an exclusive member for lock release thus increasing the number of parts. In this respect, the present invention when the actuator is operated disengages the stopper pawl from the second link by a lift force thereof to thereby release the lock, thus eliminating the necessity of a special operation mechanism for releasing lock. Accordingly, the number of parts can be reduced furthermore.

According to a third aspect of the invention, there is provided a vehicular hood device comprising a first link attached swingably to a bracket on a vehicle via a pin, a second link attached swingably to the first link via a coupling pin, and a hood provided at a front part of the vehicle and attached to the second link via a hinge pin, the hood being normally capable of opening and closing actions about the hinge pin with the first and second links folded, the hood being designed to be lifted, upon collision of the vehicle with an obstacle, by an action of an actuator, the first and second links being extendible upon the collision to determine a raised position of the hood, characterized in that it further comprises: a stopper mechanism provided between the hood and the bracket, the stopper mechanism including members arranged such that when the hood is opened a predetermined angle, they abut against each other to prevent the hood from further opening.

A stopper mechanism is provided between the hood and the bracket. The provision of the stopper mechanism can prevent the hood from opening further when the hood in a usual situation is opened by a constant angle. In this manner, because the structure merely provided with the stopper mechanism between the hood and the bracket can prevent the hood from opening by a constant angle or greater, this thus simplifies the structure of the vehicular hood device.

According to a fourth aspect of the invention, there is provided a vehicular hood device comprising a first link attached swingably to a bracket on a vehicle via a pin, a second link attached swingably to the first link via a coupling pin, and a hood provided at a front part of the vehicle and attached to the second link via a hinge pin, the hood being normally capable of opening and closing actions about the hinge pin with the first and second links folded, the hood being designed to be lifted, upon collision of the vehicle with an obstacle, by an action of an actuator, the first and second links being extendible upon the collision to determine a raise position of the hood, characterized in that it further comprises: a first link stopper provided between the first link and the bracket and a second link stopper provided between the second link and the first link, and in that when the first and second links are extended by the action of the actuator, the first link stopper prevents the first link from inclining toward a rear side of the vehicle and the second link stopper prevents the second link from inclining toward a front side of the vehicle.

After the first and second links are extended to lift the hood, the second link stopper prevents the second link from inclining toward a front of the vehicle. Accordingly, the first and second links are prevented from being folded to hold the hood in a lifted position. In this manner, the mere provision of the second link stopper can hold the hood in a lifted position, thus simplifying the structure.

In addition, after the first and second links are extended to lift the hood, the first link stopper prevents the first link from inclining toward a rear of the vehicle. Accordingly, the lifted hood is supported not to move toward the rear of the vehicle by the first link thus preventing the hood at its rear end from nearing the front windshield by a required amount or more. In this manner, the mere provision of the first link stopper can prevent the hood rear end from nearing the front windshield by a required amount or more, thus simplifying the structure.

Meanwhile, the first and second link stopper can be integrally formed with the first and second links or bracket, thus simplifying forming and hence shortening forming time. In addition, because the first and second link stoppers are integrally formed with the first and second links or bracket, the assembling of the first and second link stoppers can be eliminated.

BRIEF DESCRIPTION OF THE DRAWINGS

Certain preferred embodiments of the present invention will be explained in detail below, by way of example only, with reference to the accompanying drawings, in which:

FIG. 7 is a schematic side view illustrating an operation of the vehicular hood device according to the first embodiment, with the first and second links extended to hold the hood stationary at its upper limit position;

FIG. 17 is a sectional view taken along line 17—17 in FIG. 15;

DETAILED DESCRIPTION OF THE PREFERRED EMBODIMENTS

The following description is merely exemplary in nature and is in no way intended to limit the invention, its application or uses.

Figure 1:
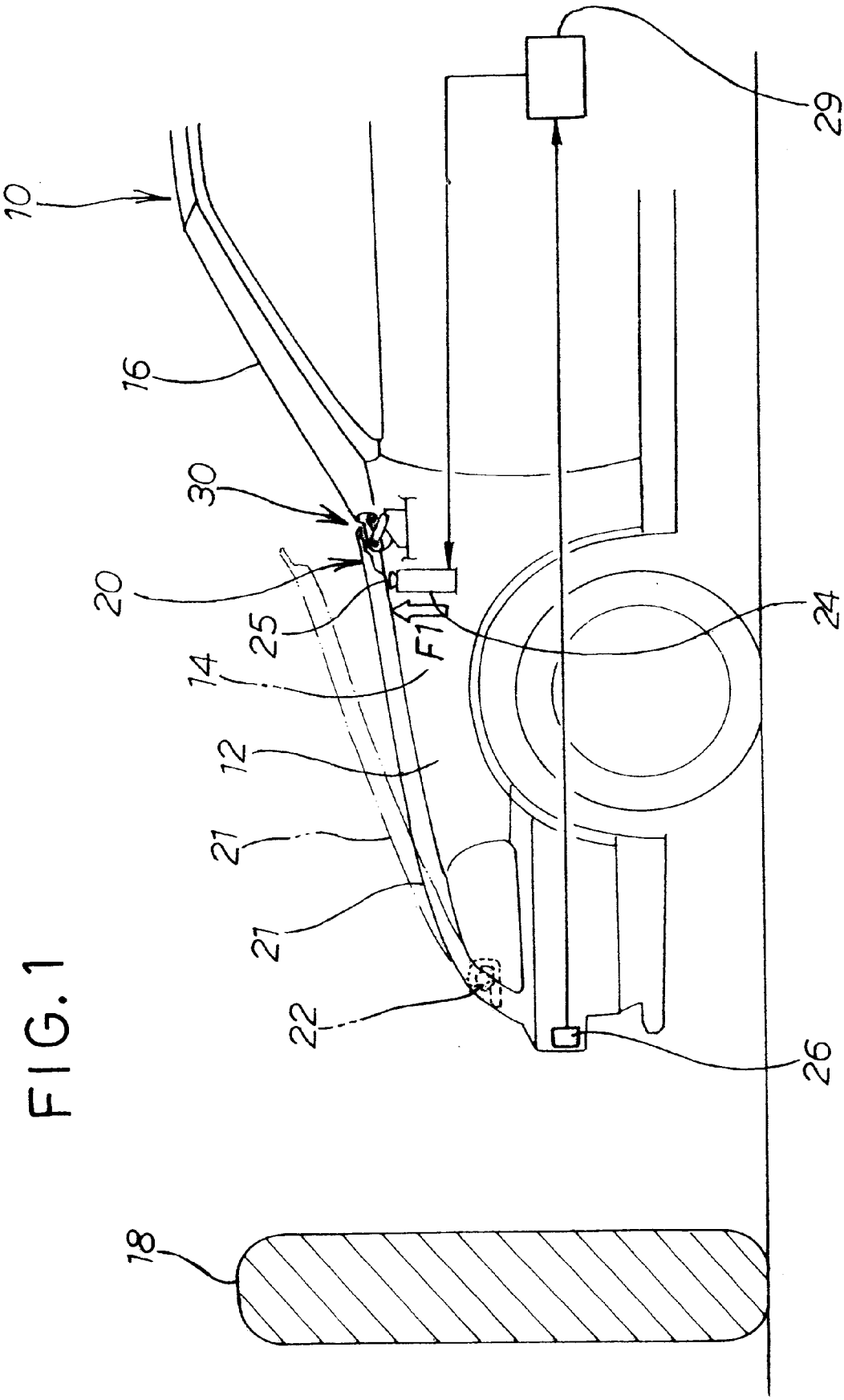
FIG. 1 is a side view of a vehicle carrying a vehicular hood device according to a first embodiment of the present invention.

Referring to FIG. 1, a vehicle 10 employs a vehicular hood device 20 according to a first embodiment of the present invention. The vehicle 10 comprises an engine compartment 14 defined between right and left front fenders 12 (only left one shown) and a vehicular hood device 20 positioned upwardly of the engine compartment 14 and forwardly of a windshield 16 for impact absorption.

The vehicular hood device 20 is designed to lift a hood 21 at the front of the vehicle up to a position shown by an imaginary line and hold the hood 21 at the lift-up position when the vehicle 10 collides with an obstacle 18. Hereunder, the vehicular hood device 20 will be described concretely.

The vehicular hood device 20 comprises a hood 21 of a front-opening type closing an upper aperture of the engine compartment 14, left and right actuators 24 (only the left shown) for lifting the hood 21 at its left and right rear ends up to the position shown by the imaginary line, a bumper sensor 26 for detecting a collision of the vehicle 10 against the obstacle 18, a control section 29 for delivering a drive signal to the actuator 24 on the basis of a detection signal from the sensor 26, and left and right hinges (hinge means) 30 (only the left shown) supporting the hood 21 at its left and right rear ends to hold it in the lift-up position shown by the imaginary line.

Incidentally, the actuators 24 are the common parts to the left and right while the hinge means 30 are also common in the left and right. Hereinafter, description is only on the actuator 24 and the hinge means 30 that are on the left side, omitting the description on the right actuator 24 and hinge means 30.

The hood 21 is structured to open at the front about a rear hinge pin as fulcrum, in order for repair and inspection, for example, in the engine compartment 14. A hood lock 22 is attached at a front to lock the hood 21 to a vehicle frame 17.

The actuator 24, mounted on the vehicle frame 17, is to ignite a gas-producing agent of an inflator thereby producing a gas. With the gas, the rod 25 is raised to lift the hood 21 by the rod 25 up to the position of the imaginary line.

Figure 2:
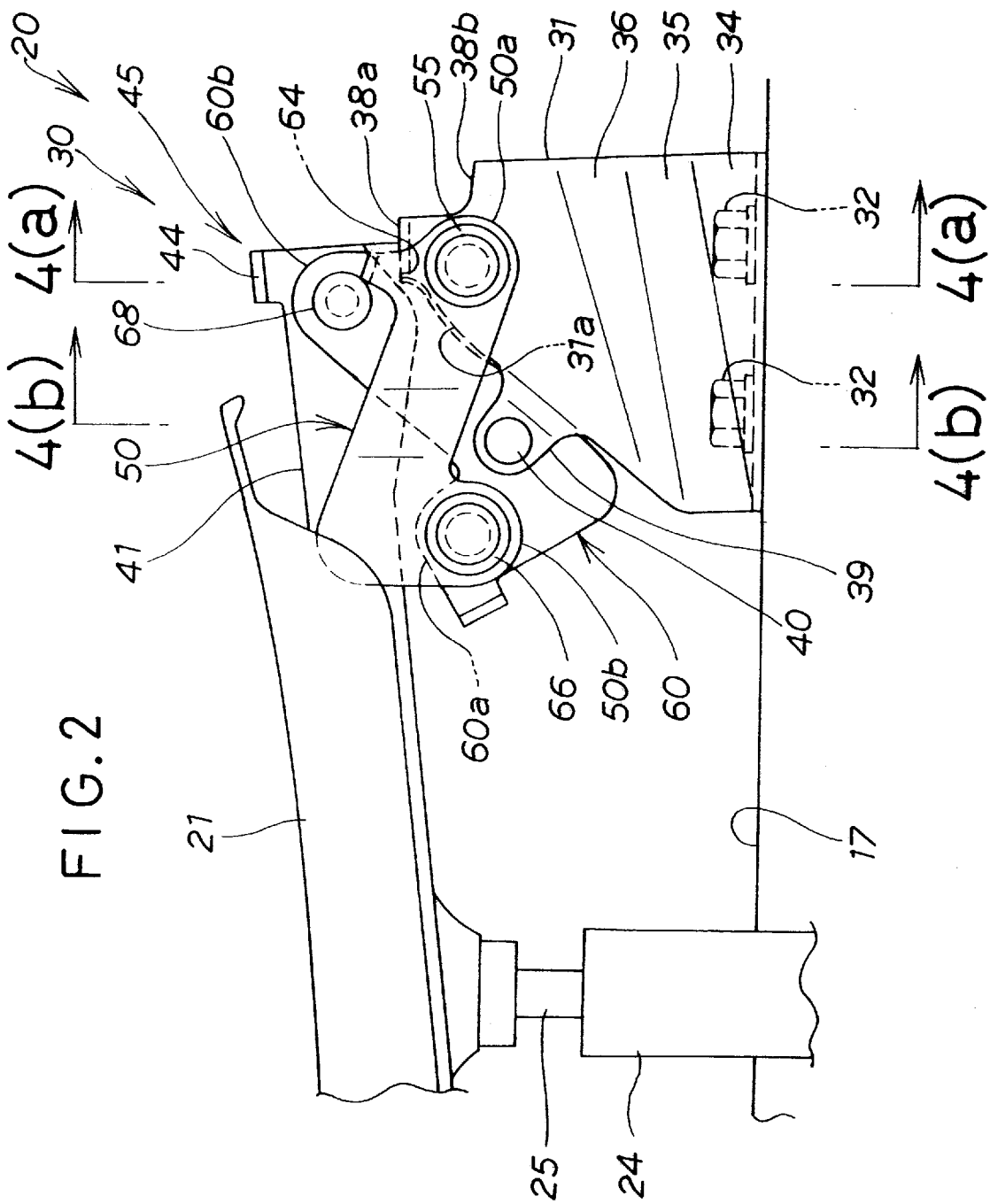
FIG. 2 is a side view of the vehicular hood device according to the first embodiment.

FIG. 2 shows the hinge means 30 of the first embodiment of the invention, as viewed from the side thereof. The hinge means 30 is structured with a lower bracket 31 attached to the vehicle frame 17 and an upper bracket 41 attached at the rear end of the hood 21, thereby bridging a first link 50 and second link 60 between the upper bracket 41 and the lower bracket 31.

The hinge means 30 will be described in detail below. In the hinge means 30, the first link 50 at a lower end 50a is attached swingably to the lower bracket 31 through a pin 55. The second link 60 at a lower end 60a is attached swingably to an upper end 50b of the first link 50 through a couple pin 66. The second link 60 at an upper end 60b is attached to the upper bracket 41 through a hinge pin 68.

In the hinge means 30, in a usual situation a rest portion 64 of the second link 60 is rested on a first stopper 38a of the lower bracket 31 (i.e. in the state the first link 50 and the second link 60 are folded). The hood 21 is opened and closed about the hinge pin 68 as a hinge center connecting between the second link 60 and the hood 21. In the event of a collision of the vehicle 10 against an obstacle 18 shown in FIG. 1, the hood 21 is lifted by the action of the actuator 24 wherein a lift position of the hood 21 is determined by the extended first and second links 50, 60. Thus, the hinge serves also as a couple-link mechanism.

In addition, the hinge means 30 upon operation of the actuator 24 allows the first and the second links 50, 60 to extend, but in a usual situation provides mechanical coupling to suppress the first and second links 50, 60 from extending. Meanwhile, a stopper mechanism 45 is provided between the hood 21 (specifically, the upper bracket 41) and the lower bracket 31 to prevent the hood from opening further in the case where the hood 21 in a usual situation opens a constant angle.

The stopper mechanism 45 comprises a first opening-prevention stopper 38a provided on the lower bracket 31 and a second opening-prevention stopper 44 provided on the upper bracket 41.

Figure 3:
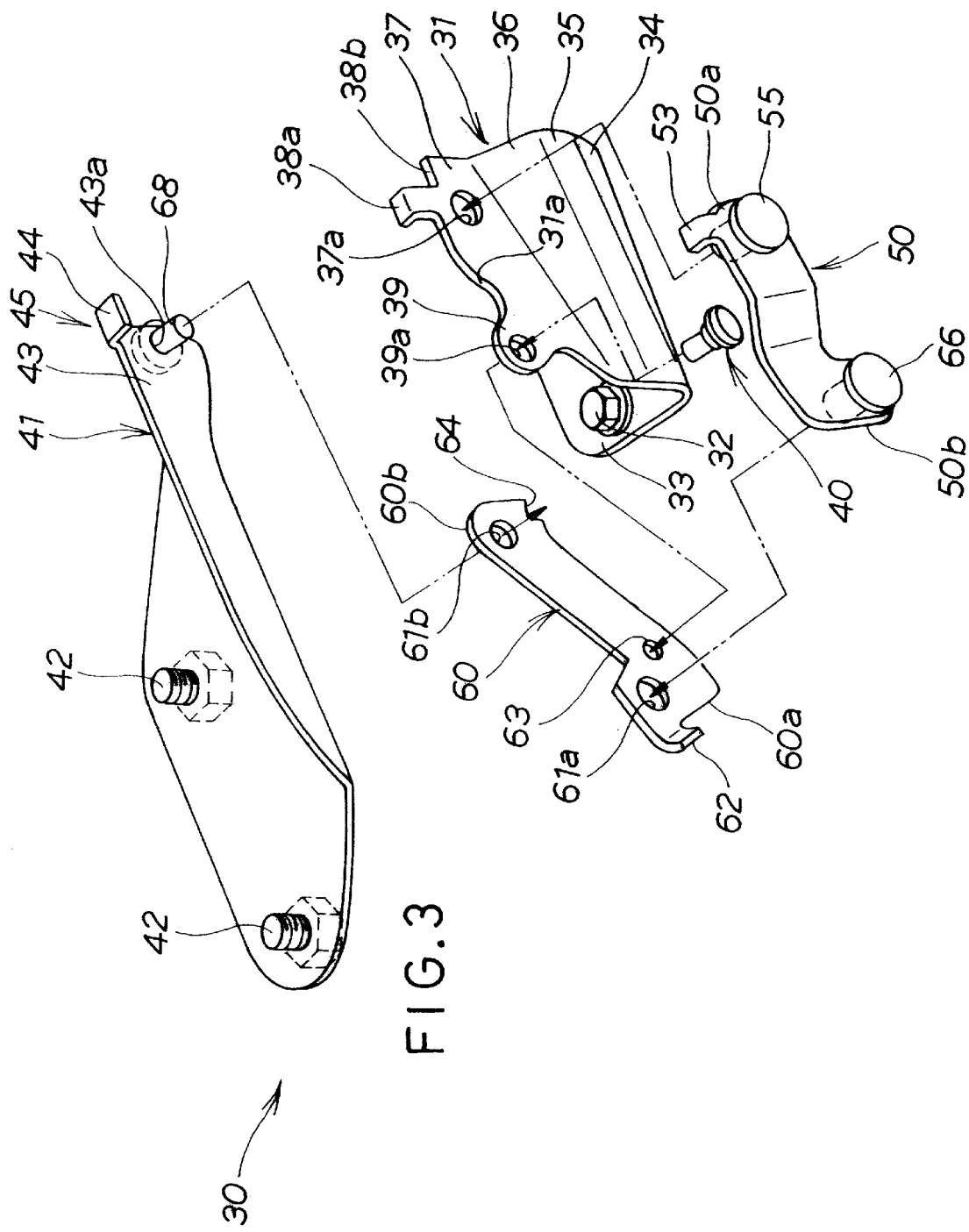
FIG. 3 is an exploded perspective view showing hinge means forming part of the vehicular hood device according to the first embodiment.

FIG. 3 shows a disassembled state of the hinge means 30 of a first embodiment according to the invention. The lower bracket 31 of the hinge means 30 comprises a seat 33 for mounting to the vehicle frame 17 (shown in FIG. 2) through bolts 32, 32 (only one shown), a first bend portion 34 obliquely upwardly extending toward an outside direction of the frame 17 from the seat 33, a second bend portion 35 vertically raised from the first bend portion 34, a third bend portion 36 obliquely upwardly extending toward an inside direction of the vehicle frame 17 from the second bend portion. 35, a fourth bend portion 37 generally in a trapezoidal form vertically raised from the third bend portion 36, a first opening-prevention stopper 38a upwardly extending from an upper end of the fourth bend portion 37 and bent toward an inner side of the vehicular body, a stopper 38b adjacent the first opening-prevention stopper 38a and a protuberance 39 upwardly projecting from a slant portion of the fourth bend portion 37.

In addition, the lower bracket 31 has a hole 37a in the fourth bend portion 37 to insert a pin 55 therein and a stopper hole 39a in the protuberance 39 to insert a stopper pin 40 therein.

The upper bracket 41 is a member formed generally in an L form in order for mounting to a back surface of the hood 21 (shown in FIG. 2) through bolts 42, 42. This has a hole 43a formed at the rear of a vertical portion 43 to insert a hinge pin 68 and a second opening-prevention stopper 44 formed by bending in the vicinity of the hole 43a.

The first link 50, a member formed generally in an L form (see also FIG. 2), has a lower hole in a lower end 50a having a pin 55 inserted therein and a stopper 53, and an upper hole in an upper end 50b having a coupling pin 66 inserted therein.

The second link 60, a member formed generally in an L form (see also FIG. 2), has a lower hole 61a opened in a lower end 60a to insert the coupling pin 66 therein, a stopper hole 63 opened in the vicinity of the lower hole 61a to insert the stopper pin 40 therein, a stopper 62 provided in the vicinity of the lower hole 61a, an upper hole 61b opened in an upper end 60b to insert the hinge pin 68 therein, and a rest portion 64 provided in the vicinity of the upper hole 61b to be rested upon the first opening-prevention stopper 38a of the lower bracket 31.

Incidentally, the roles of the first and second opening-prevention stoppers 38a, 44 and the other stoppers 38b, 53, 62 will be explained in detail in FIG. 5 to FIG. 9.

Next, one example of an assembling procedure of the hinge means 30 is explained with reference to FIG. 3. First, the pin 55 is inserted in the lower hole of the first link 50. This pin 55 is inserted and crimped in the hole 37a of the lower bracket 31. This attaches the first link 50 for swing to the lower bracket 31.

Next, the hinge pin 68 is inserted in the hole 43a of the upper bracket 41. The hinge pin 68 is inserted and crimped in the upper hole 61b of the second link 60. This attaches the second link 60 for swing to the upper bracket 41.

Next, the first link 50 and the second link 60 are coupled together by the coupling pin 66 and then the coupling pin 66 is crimped. This couples the first link 50 and the second link 60, for swing relative to each other. Subsequently, the stopper pin 40 is inserted in the stopper hole 39a of the lower bracket 31 and stopper hole 63 of the second link 60 and then the stopper pin 40 is crimped. This connects the second link 60 to the lower bracket 31 through the stopper pin 40.

In the state where the first and second link 50, 60 and the upper bracket 41 are assembled on the lower bracket 31 in this manner, the lower bracket 31 is mounted to the vehicle frame 17 (shown in FIG. 2) by bolts 32, 32.

Finally, the upper bracket 41 is attached to the hood 21 (shown in FIG. 2) by bolts 42, 42. This completes the assembling of the hinge means 30.

The hinge means 30, in a folded state of the first and second links 50, 60 shown in FIG. 2, can be positioned in a state that the rest portion 64 of the second link 60 is rested on the first opening-prevention stopper 38a of the lower bracket 31. This restricts the second link 60 from moving downward by the first opening-prevention stopper 38a, making possible to support the hood 21 in a stable state.

The hinge means 30 has a stopper pin 40 to connect the second link 60 to the lower bracket 31 in the state the first and second links 50, 60 are folded, as shown in FIG. 2. The stopper pin 40 has a strength which allows it to be cut when the actuator 24 operates but not to be cut by the usual hood opening/closing force, in order to prevent the hood 21 from being floated up.

In the hinge means 30, by forming the first and second links 50, 60 shown in FIG. 2 each generally in an L form, the second link 60 can be attached along the slant portion 31a of the lower bracket 31 and the first link 50 be attached distantly from the slant portions 31a. This can secure a site to have the stopper pin 40 in the vicinity of the slant portion 31a.

Furthermore, in the hinge means 30, by arranging the second link 60 along the slant portion 31a of the lower link 31 as shown in FIG. 2, the second link 60 can be inclined downward in a forward direction of the vehicle. Due to this, the lower bracket 31 at its pin 55 attaching position can be set in a comparatively high position with respect to the vehicle frame 17 (shown in FIG. 2).

Due to this, the form of the lower bracket 31 can be determined such that the hood 21 is ready to be crushed in the event an obstacle hits against the same. Incidentally, the form of the lower bracket 31 will be explained in detail in FIG. 4.

Figure 4A:
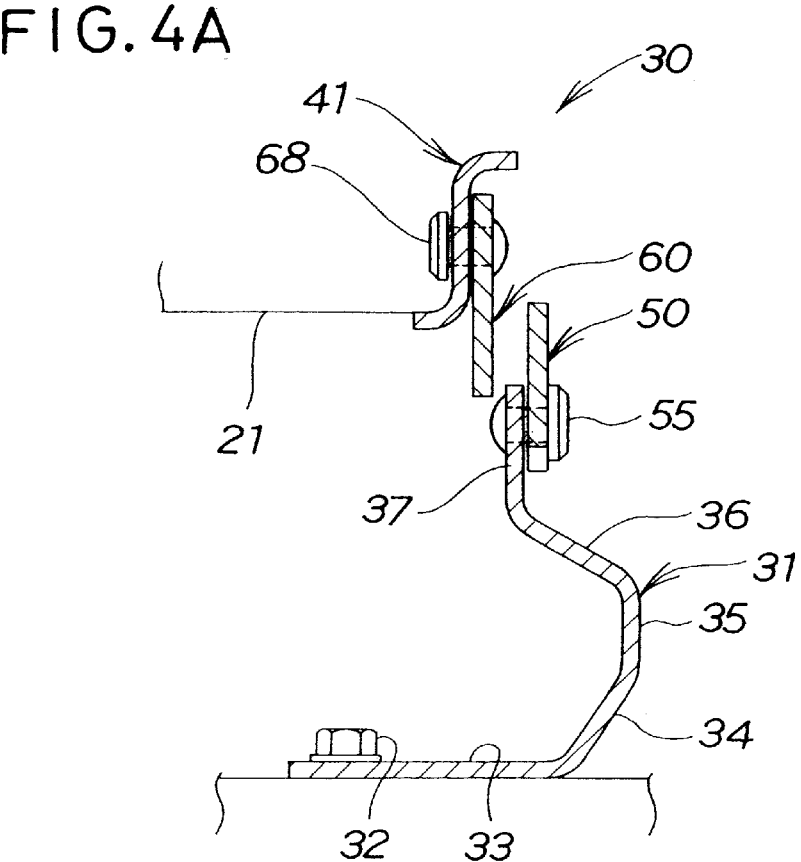
FIGS. 4A and 4B are sectional views of the vehicular hood device according to the first embodiment.
Figure 4B:
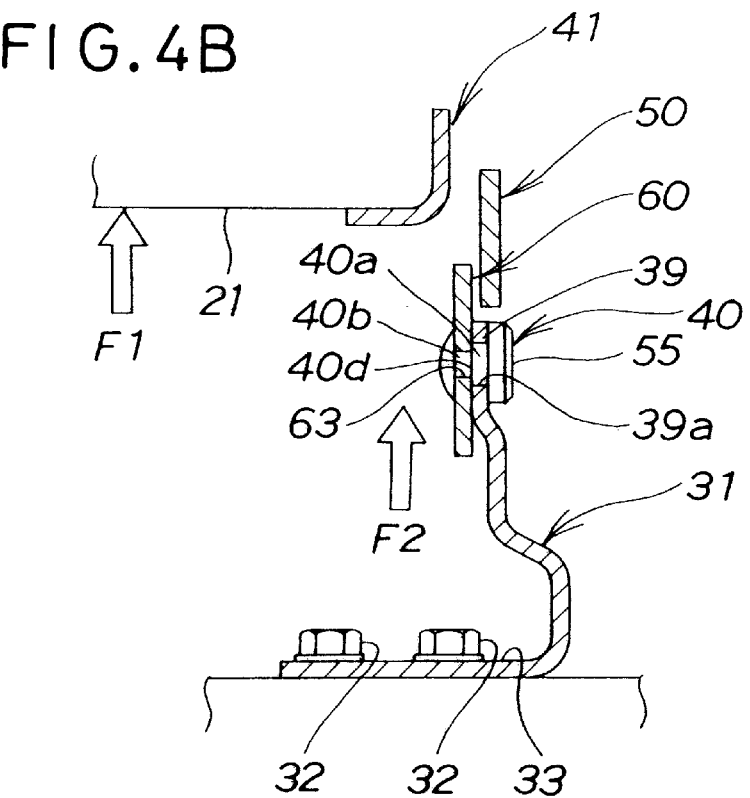

FIG. 4A shows a section on line 4(a)—4(a) in FIG. 2 while FIG. 4B shows a section on line 4(b)—4(b) in FIG. 2. FIG. 4A shows a state that the first link 50 is attached to the fourth bend portion 37 of the lower bracket 31 by the pin 55 and the second link 60 is on the upper bracket 41 by the hinge pin 68.

The lower bracket 31 is a member formed, for example, of a soft steel bent generally in an inverted squared-U form having a second bend portion 35, a third bend portion 36 and a fourth bend portion 37 that is a form ready to be crushed. Due to this, when the lower bracket 31 is applied by a load from the above, it is possible to absorb an impact by crushing the second bend portion 35, third bend portion 36 and fourth bend portion 37.

FIG. 4B shows a state that the stopper pin 40 is inserted in the stopper hole 39a of the lower bracket 31 and stopper hole 63 of the second link 60 and the stopper pin 40 is crimped. The stopper pin 40 has a strength that allows it to be cut when the actuator 24 (shown in FIG. 2) operates but not to be cut with the usual hood opening/closing force.

Accordingly, in the usual time where the second link 60 is connected to the lower bracket 31 by the stopper pin 40 thereby providing mechanical coupling to suppress the first and second links 50, 60 from extending, the hood 21 in the usual situation can be prevented from being floated up.

The mere provision of the stopper pin 40 makes it possible to prevent against chattering due, for example, to float-up of the hood 21 during traveling of the vehicle, thus reducing the number of parts.

Meanwhile, the stopper pin 40 upon operation of the actuator 24 (shown in FIG. 2) is cut by a lift-up force of the actuator 24 to release the state where the second link 60 is connected to the lower bracket 31. Accordingly, it is possible to omit the operation mechanism for unlocking of the prior art. This can further reduce the number of parts.

Figure 5A:
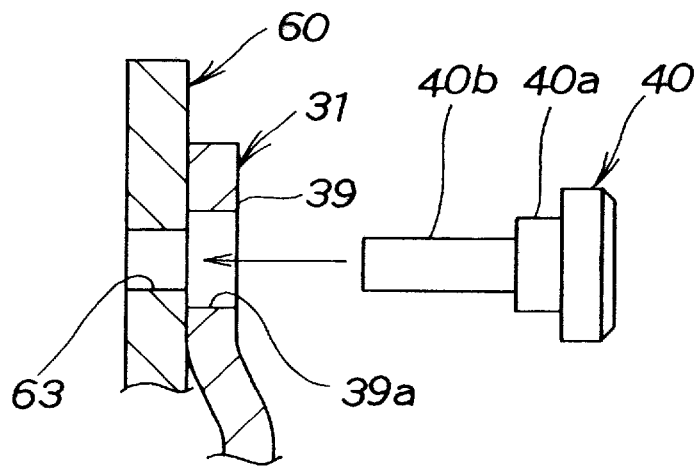
FIGS. 5A, 5B and 5C are schematic side views illustrating procedures for assembling the hood device according to the first embodiment.
Figure 5B:
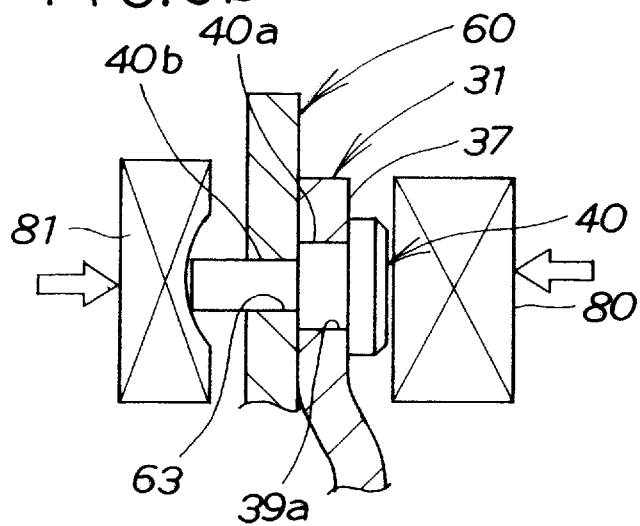
Figure 5C:
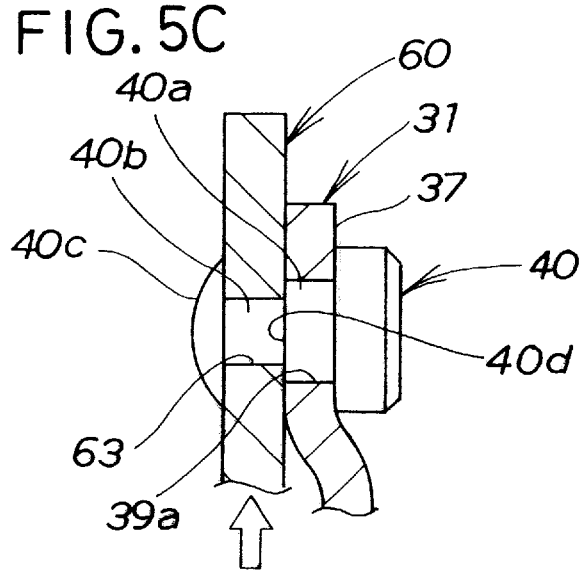

FIGS. 5A to 5C show a procedure for assembling the stopper pin 40 of the first embodiment. In FIG. 5A, the stopper pin 40 is inserted in the stopper hole 39a of the lower bracket 31 and stopper hole 63 of the second link 60, as indicated by an arrow. In FIG. 5B, the stopper pin 40 at its head and tip is clamped by a crimp device 80 and a load is applied as indicated by open arrows, to crush the tip of the stopper pin 40. In FIG. 5C, the stopper pin 40 is prevented at a crushed portion 40c of the stopper pin 40 from being removed.

Herein, the stopper pin 40 is formed with a larger diameter portion 40a and a smaller diameter portion 40b, to be readily cut at a step 40d. With this stopper pin 40, the larger diameter portion 40a is inserted in the stopper hole 39a and the smaller diameter portion 40b in the stopper hole 63, thereby placing the step 40d at the boundary between the lower bracket 31 and the second link 60. Accordingly, when the actuator 24 is operated, the stopper pin 40 can be positively cut at the step 40d.

Next, the operation of the vehicular hood device 20 of the first embodiment is explained on the basis of FIG. 1, FIG. 4 and FIG. 6 to FIG. 11.

First, explanation is made for the case where the vehicle collides against an obstacle. Referring back to FIG. 1, if the vehicle 10 in traveling collides against an obstacle 18, the bumper sensor 26 detects a collision to transmit a detection signal from the bumper sensor 26 to the control section 29. The control section 29 transmits a drive signal to the actuator 24 so that a gas pressure is exerted on the actuator 24 to project the rod 25. By the gas pressure acted upon the rod 25 of the actuator 24, the rod 25 is instantaneously raised by the gas pressure to apply a lift-up force F1 to the hood 21 as shown by the arrow.

Next, by applying a lift force F1 to the hood 21 as shown in FIG. 4B, a force F2 acts to lift up the smaller diameter portion 40b of the stopper pin 40 through the upper bracket 41, hinge pin 68 (shown in FIG. 4A) and stopper hole 63 of the second link 60. Due to this, the stopper pin 40 is cut at its step 40d.

Figure 6A:
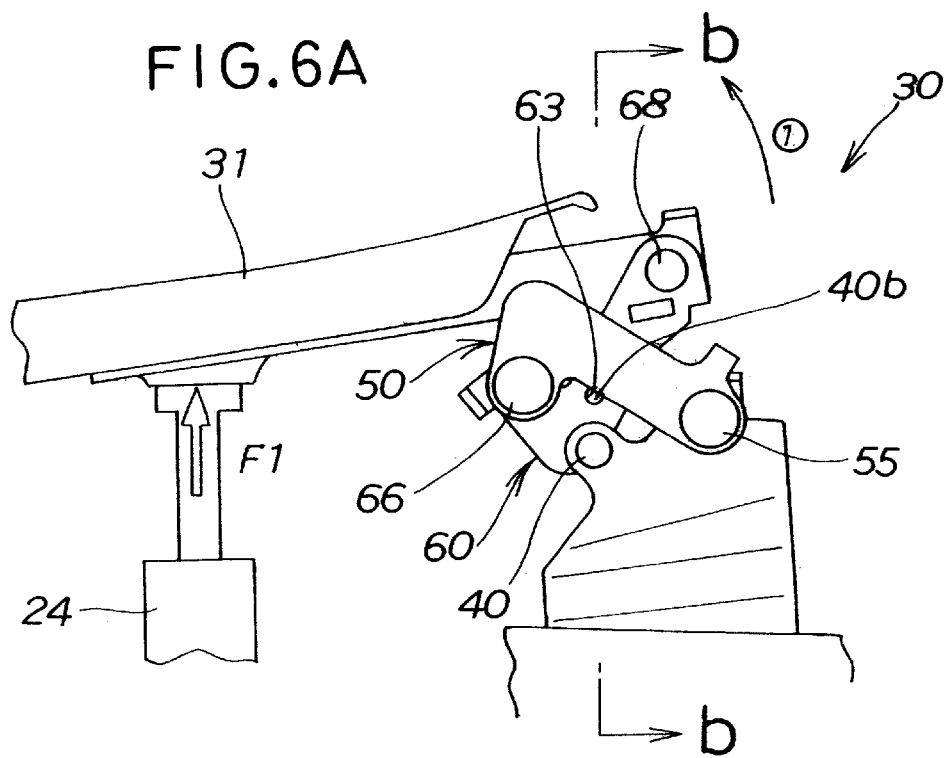
FIGS. 6A and 6B are schematic views illustrating an operation of the vehicular hood device according to the first embodiment, with the stopper pin cut to cause first and second links to swing.

In FIG. 6A, due to cutting of the stopper pin 40, the second link 60 swings counterclockwise about the coupling pin 66 as an axis. Simultaneously, the first link 50 swings clockwise about the pin 55 as an axis.

Figure 6B:
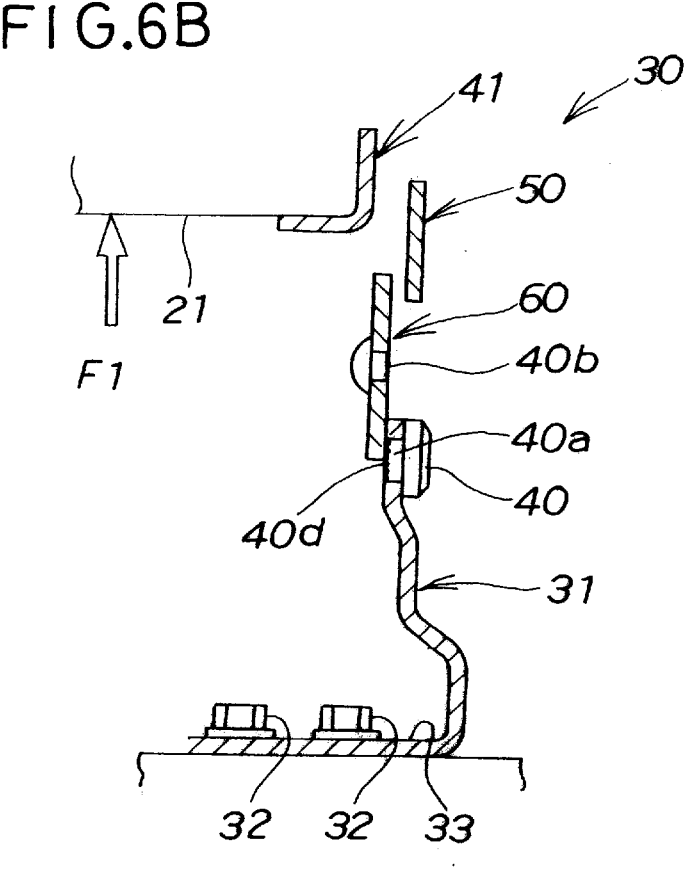

Consequently, by a start of extension of the first and second links 50, 60, the hood 21 is raised as shown at an arrow (1) about a hood lock mechanism 22 (shown in FIG. 1) as an axis. FIG. 6B is a sectional view on line b—b in FIG. 6A. As shown in FIG. 6B, the stopper pin 40 is cut at the step 40d.

In FIG. 7, the first and second links 50, 60 extend to position the pin 55, the coupling pin 66 and the hinge pin 68 on a straight line 70. Due to this, the first and second links 50, 60 restrict the hood 21 from rising thus positioning the hood 21 stationary at an upper limit position P1.

The weight of the hood 21, after halt, acts to descend the hood 21. Consequently, the weight of the hood 21 acts upon the first and second links 50, 60 to fold the first and second links 50, 60.

However, because the pin 55, the coupling pin 66 and the hinge pin 68 are positioned on the straight line 70, the first and second links 50, 60 even applied by the weight of the hood 21 will not be folded. For this reason, the hood 21 can be held by the first and second links 50, 60.

In this state, an obstacle 18 falls on the hood 21 thereby applying an external force F3 as shown at an arrow. This applies a force to incline the first link 50 rearward of the vehicle about the pin 55 as an axis. However, the first link 50 can be prevented from inclining toward the rear of the vehicle by abutting the stopper 53 of the first link 50 against the stopper 38b of the lower bracket 31.

Simultaneously, a force is applied to incline the second link 50 forward of the vehicle about the coupling pin 66 as an axis. However, the second link 60 can be prevented from inclining toward the forward of the vehicle by abutting the stopper 62 of the second link 60 against the first link 50.

Accordingly, because the first and second links 50, 60 can be kept in an extension state, the hood 21 can be held at the upper limit position P1 where it is lifted by a predetermined amount by the hinge means 30.

Figure 8:
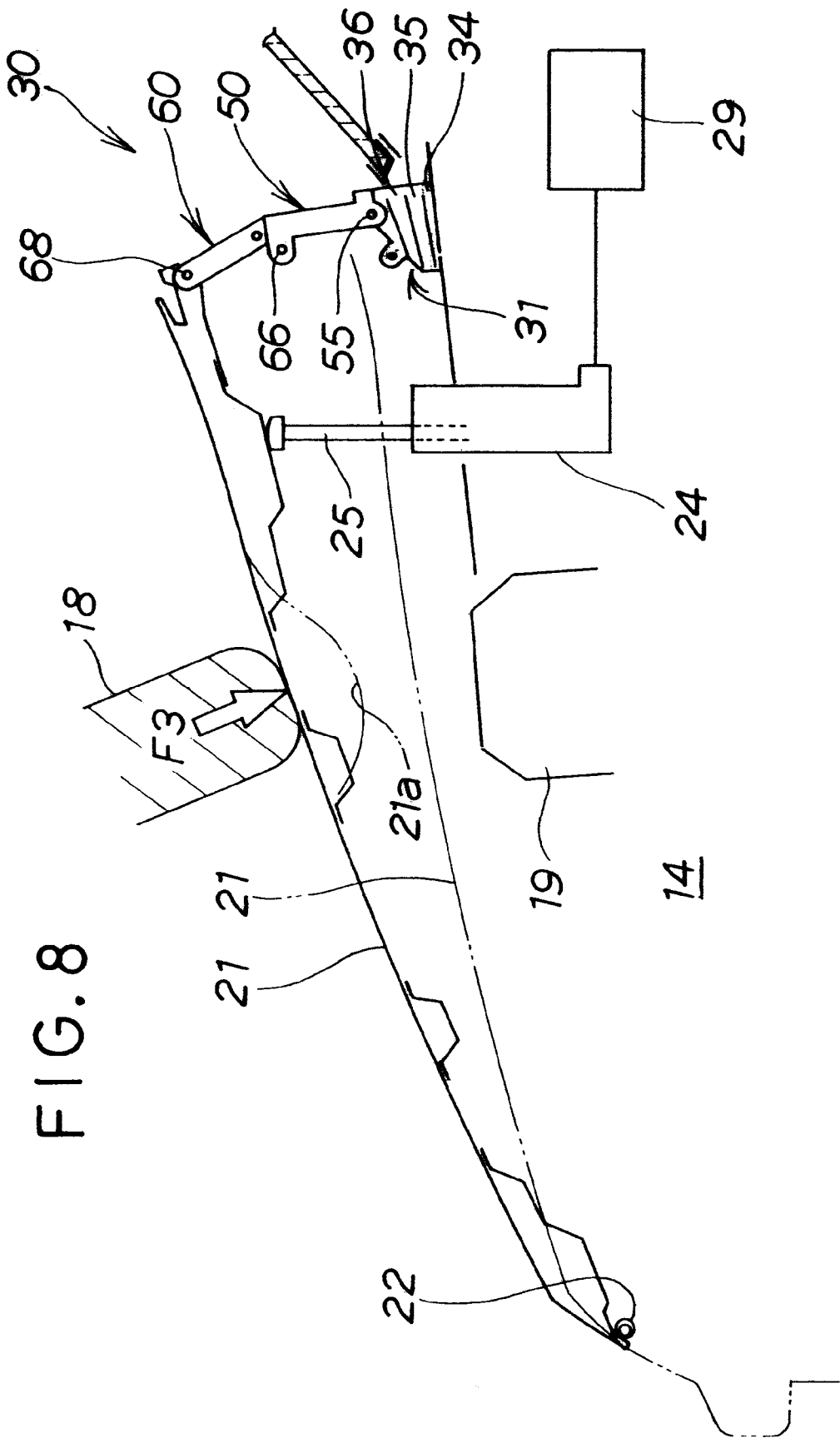
FIG. 8 is a schematic side view showing an operation of the vehicular hood device according to the first embodiment, with an obstacle falling onto the hood at its upper limit position.

In FIG. 8, by lifting the hood 21 by a predetermined amount from a position shown at an imaginary line to a position shown at a solid line, it is possible to increase the distance from the hood 21 to an apparatus 19 such as an engine accommodated in the engine compartment 14. Accordingly, the hood 21 can secure its downward deformation amount sufficiently.

Consequently, in the event that the obstacle 18 falls onto the hood 21 to apply an external force F3 as shown at the arrow, it is possible to secure broad a dent 21a in the hood 21 as shown by an imaginary line. Accordingly, the impact exerted to the obstacle 18 can be absorbed positively.

In addition, as shown in FIG. 4A the lower bracket 31 at the second bend portion 35, third bend portion 36 and fourth bend portion 37 is bent generally in an inverted squared-U form that is a form ready to be crushed. Accordingly, when the obstacle 18 falls onto the hood 21 to apply an external force F3 as shown at the arrow, the second bend portion 35, third bend portion 36 and forth bend portion 37 can be crushed to absorb an impact. Thus, the impact exerted to the obstacle 18 can be absorbed more positively.

Meanwhile, if the dent amount of the dent 21a caused in the hood 21 is increased as shown at an imaginary line, the dent 21a will not interfere with the engine compartment apparatus 19. Thus, the apparatus 19 can be protected from the obstacle 18.

Next, explained is an example of opening the hood 21 in order for maintenance and inspection of the engine compartment.

Figure 9A:
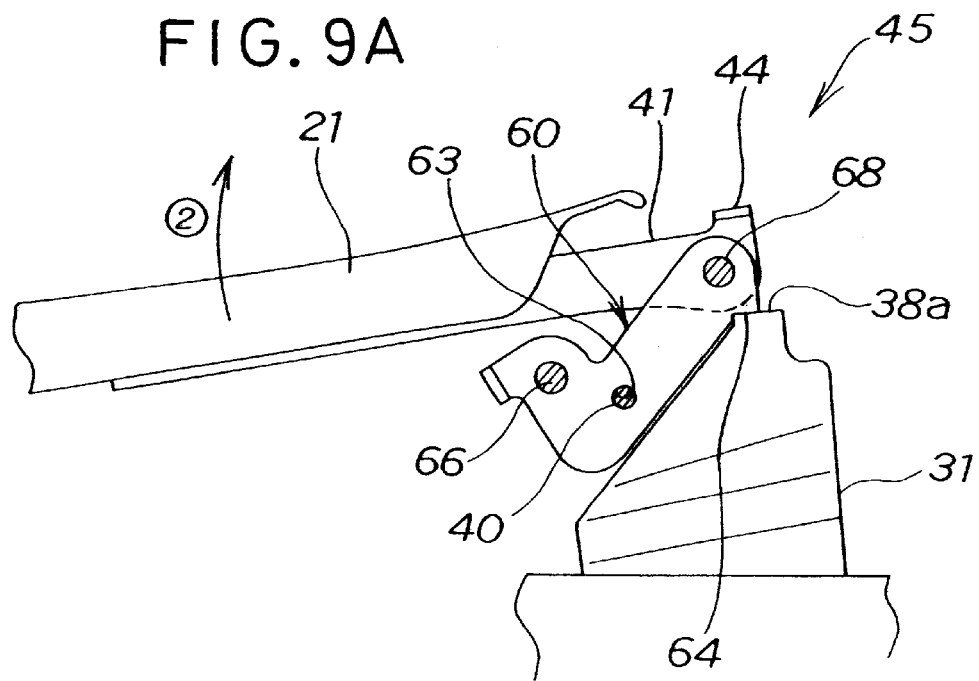
FIGS. 9A and 9B are schematic side views showing an operation of the vehicular hood device of the first embodiment, with the hood opened about a hinge pin as an axis at a rear end thereof.
Figure 9B:
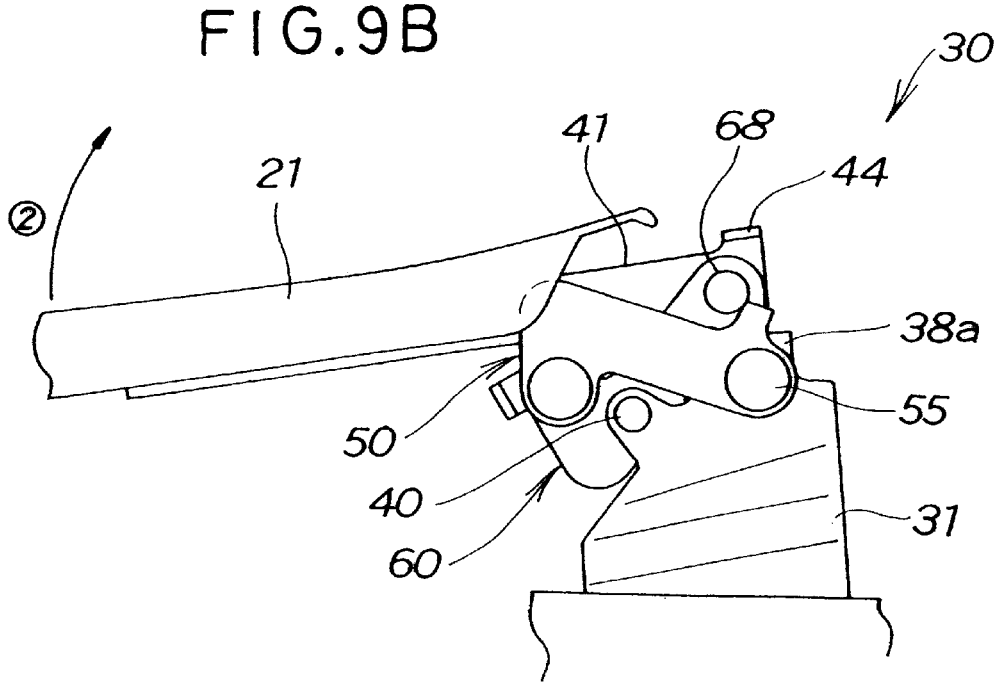

In FIGS. 9A and 9B, the rest portion 64 of the second link 60 is rested on the first opening-prevention stopper 38a of the lower bracket 31, and then the stopper pin 40 is inserted in the stopper hole 39a of the lower bracket 31 and stopper hole 63 of the second link 60 shown in FIG. 4B. Due to this, the first and second links 50, 60 are kept in a folded state. In this state, the hood lock mechanism 22 (shown in FIG. 1) in front of the hood 21 is released to open the hood 21 as shown at the arrow (2) about as an axis the hinge pin 68 on the rear end side of the hood 21.

Figure 10A:
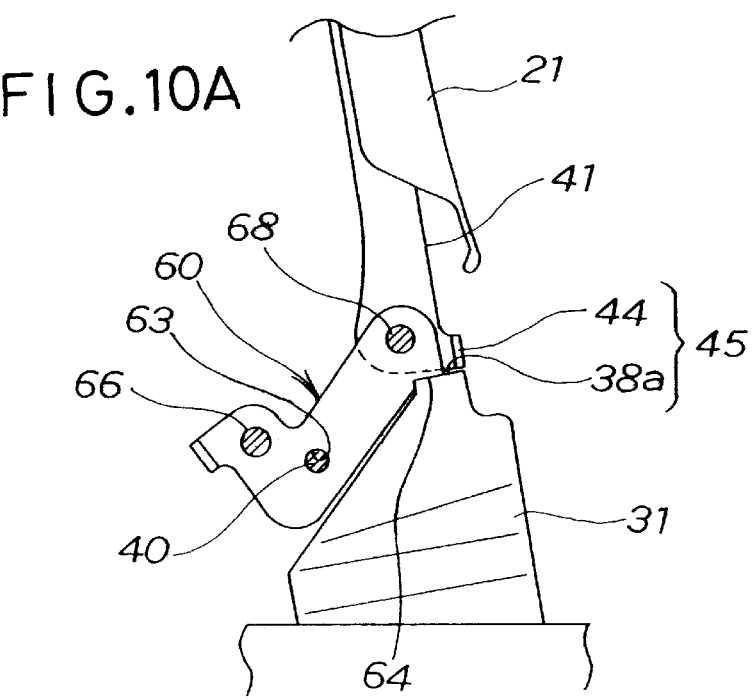
FIGS. 10A and 10B are schematic side views illustrating an operation of the vehicular hood device of the first embodiment, with the hood fully opened and the first and second opening prevention stoppers abutted against each other.
Figure 10B:
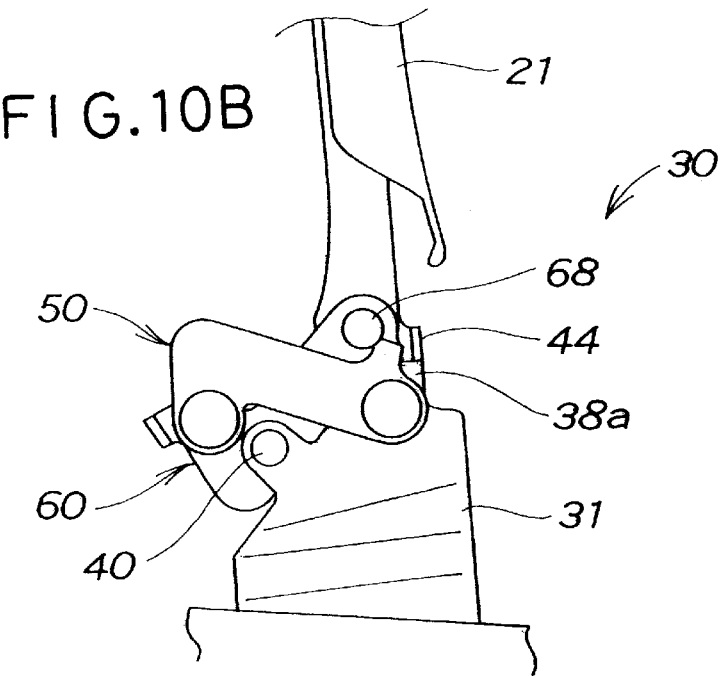

In FIGS. 10A and 10B, by opening the hood 21 up to a full-open position, the second opening-prevention stopper 44 of the upper bracket 41 abuts against the first opening-prevention stopper 38a of the lower bracket 31, thereby restricting the hood 21 from further opening.

By opening the hood 21, maintenance and inspection can be made from the above for the apparatus in the engine compartment.

Incidentally, when the second opening-prevention stopper 44 abuts against the first opening-prevention stopper 38a due to opening the hood 21, such a force acts that rotates the second link 60 clockwise about the hinge pin 68 as an axis. However, the second link 60 can be kept in a stationary state by resting the rest portion 64 on the first open-prevention stopper 38a of the lower bracket 31 and inserting the stopper pin 40 in the stopper holes 39a, 63.

By the provision of the second opening-prevention stopper 44 on the upper bracket 41 and the first opening-prevention stopper 38a on the lower bracket 31, when the hood 21 is opened by a constant angle in a usual situation, the parts constituting a stopper mechanism 45 come into abutment, i.e. the second opening-prevention stopper 44 abuts against the first opening-prevention stopper 38a thereby preventing the hood 21 from further opening.

The hood 21 can be prevented from opening to a constant angle or greater by merely providing the stopper mechanism 45 (second opening-prevention stopper 44 and first opening-prevention stopper 38a) to abut the second opening-prevention stopper 44 against the first opening-prevention stopper 38a.

Because the hood 21 can be prevented from opening to a constant angle or greater by the structure merely provided with the second opening-prevention stopper 44 and first opening-prevention stopper 38a, the hinge mechanism 30 of the vehicular hood device 20 can be simplified in structure. Hence, the device can be reduced in size and weight.

Figure 11:
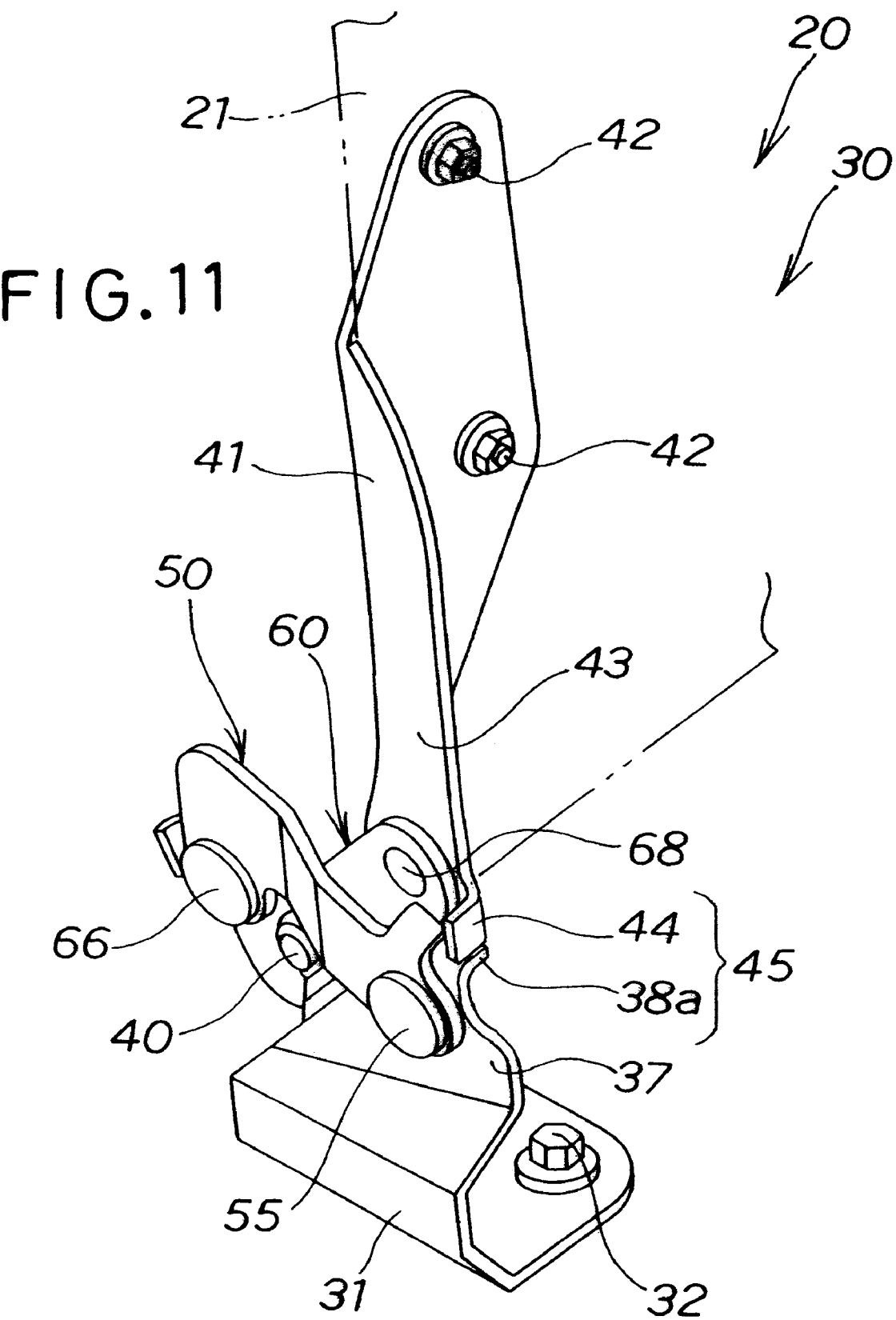
FIG. 11 is a schematic perspective view showing an operation of the vehicular hood device of the first embodiment, with the hood opened and abutted against the first and second opening preventing stoppers.

FIG. 11 shows a state where the hood 21 of the first embodiment is opened. A second opening-prevention stopper 44 is formed by bending the upper bracket 41 at its vertical portion 43 while a first opening-prevention stopper 38a is formed by bending a lower bracket 31 at its fourth bending portion 37.

Accordingly, it is possible to secure the contact area between the second opening-prevention stopper 44 and the first opening-prevention stopper 38a, i.e. of the stopper mechanism 45. Hence, the hood 21 can be positively restricted from opening.

Incidentally, because the above can be formed by merely bending the second opening-prevention stopper 44 and first opening-prevention stopper 38a, it is possible to further simplify the structure of the second opening-prevention stopper 44 and first opening-prevention stopper 38a.

Next, second to fourth embodiments are explained. It is noted that the same members as the members of the first embodiment of vehicular hood device are denoted by the same reference numerals and detailed explanations thereof are omitted.

Second Embodiment

Figure 12:
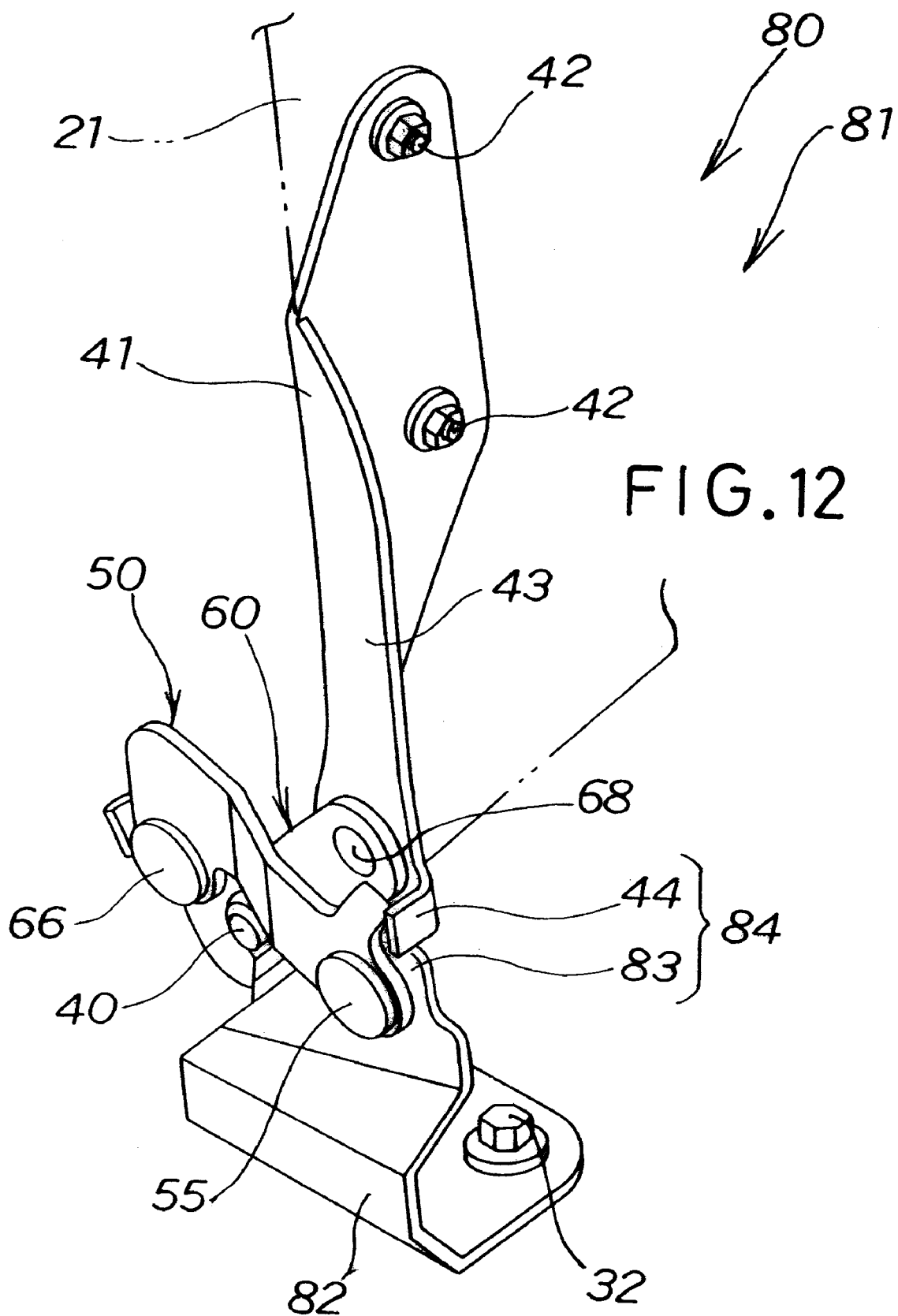
FIG. 12 is a perspective view showing a vehicular hood device according to a second embodiment of the present invention.

FIG. 12 shows a vehicular hood device 80 of a second embodiment according to the invention. The vehicular hood device 80 of the second embodiment has hinge means 81. The hinge means 81 has a stopper mechanism 84 comprising a first opening-prevention stopper 83 and a second opening-prevention stopper 44, by forming the first opening-prevention stopper 83 of a lower bracket 82 without bending the lower bracket 82. It is noted that other structures are the same as those of the first-embodiment hinge means 30.

The second embodiment provides the effects similar to those of the first embodiment. In addition, because the first opening-prevention stopper 83 is formed not by bending the lower bracket 82, it is possible to omit the labor and time for bending the lower bracket 82. Accordingly, the lower bracket 82 is simplified in forming thereby further enhancing the producibility.

Third Embodiment

Figure 13:
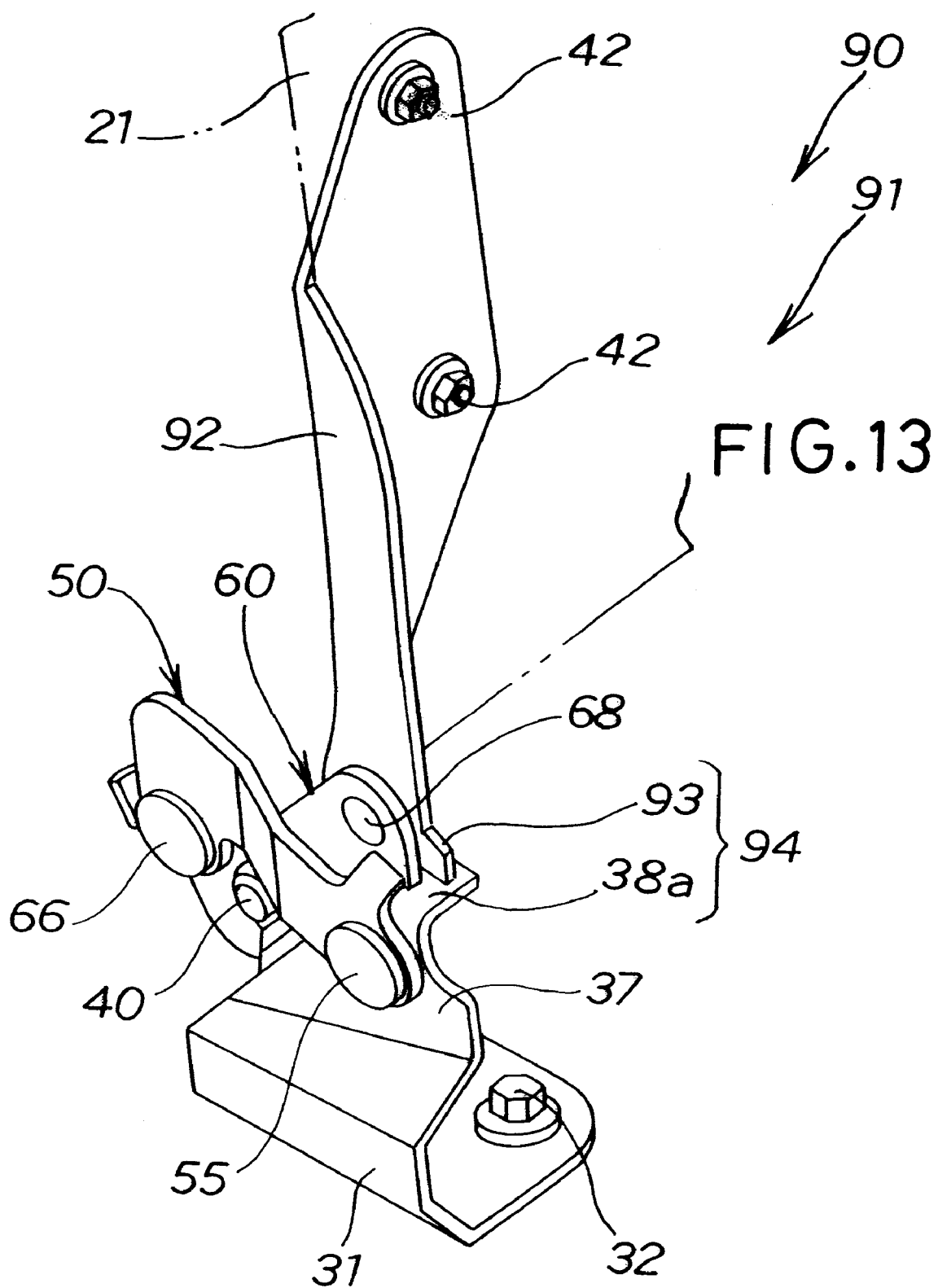
FIG. 13 is a perspective view showing a vehicular hood device according to a third embodiment of the present invention.

FIG. 13 shows a vehicular hood device 90 of a third embodiment according to the invention. The vehicular hood device 90 of the third embodiment has hinge means 91. The hinge means 91 has a stopper mechanism 94 comprising a first opening-prevention stopper 38a and a second opening-prevention stopper 93, by forming the second opening-prevention stopper 93 of an upper bracket 92 without bending the upper bracket 92. It is noted that other structures are the same as those of the first-embodiment hinge means 30.

The third embodiment provides the effects similar to those of the first embodiment. In addition, because the second opening-prevention stopper 93 is formed not by bending the upper bracket 92, it is possible to omit the labor and time for bending the upper bracket 92. Accordingly, the upper bracket 92 is simplified in forming thereby further enhancing the producibility.

Fourth Embodiment

Figure 14:
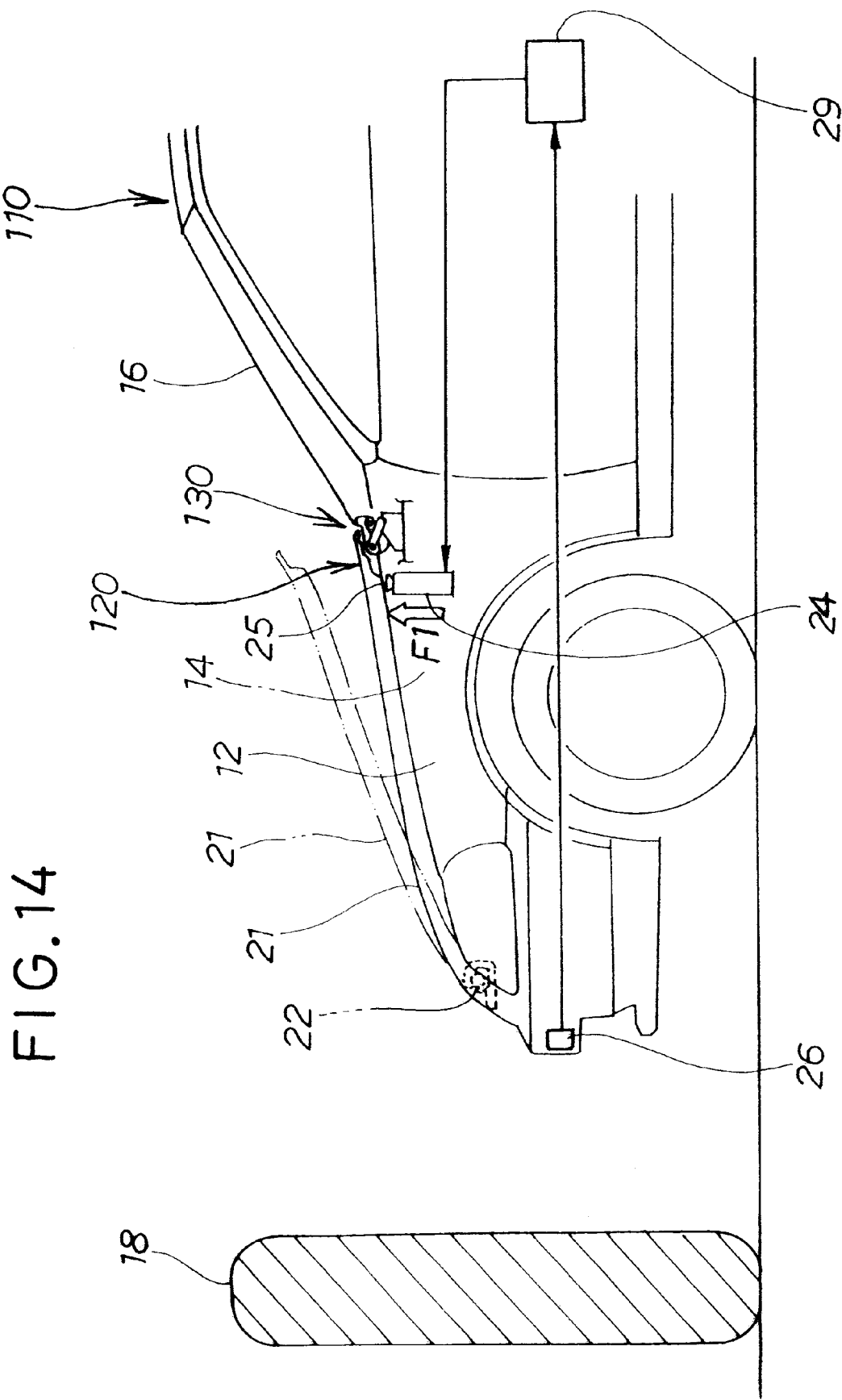
FIG. 14 is a side view showing a vehicle employing a vehicular hood device according to a fourth embodiment of the present invention.

FIG. 14 shows a vehicle 110 mounted thereon with a vehicular hood device 120 of a fourth embodiment according to the present invention. The vehicle 110 shown in FIG. 14 has an engine compartment 14 formed between the front fenders 12 on the left and right (only the left shown), and a vehicular hood device 120 for impact absorption is arranged above the engine compartment 14 and in front of the front windshield 16.

The vehicular hood device 120 is to lift a hood 21 at the front of the vehicle up to a position shown at the imaginary line and hold the hood 21 at the lift-up position when the vehicle 110 collides against an obstacle 18. Hereunder, the vehicular hood device 120 will be described concretely.

The vehicular hood device 120 comprises the hood 21 of a front-opening type closing an upper aperture of the engine compartment 14, left and right actuators 24 (only the left shown) for lifting the hood 21 at its left and right rear ends thereof up to the position shown at the imaginary line, a bumper sensor 26 for detecting a collision of the vehicle 110 against the obstacle 18, a control section 29 for delivering a drive signal to the actuators 24 on the basis of a detection signal from the sensor 26, and left and right hinges (hinge means) 130 (only the left shown) supporting the hood 21 at its left and right rear ends to hold it in the lift-up position shown at the imaginary line.

Incidentally, the actuators 24 are the common parts to the left and right while the hinge means 130 are also common to the left and right. Hereinafter, description is only on the actuator 24 and the hinge means 130 that are on the left side, omitting the description on the right actuator 24 and hinge means 130.

The hood 21 is structured to open at the front about rear hinge pins as fulcrums, in order for repair and inspection, for example, in the engine compartment 14. A hood lock 22 is attached at a front to lock the hood 21 to a vehicle frame 17.

The actuator 24, mounted on the vehicle frame 17, is to ignite a gas-producing agent of an inflator thereby producing a gas. With the gas, the rod 25 is raised to lift the hood 21 by the rod 25 up to the position of the imaginary line.

Figure 15:
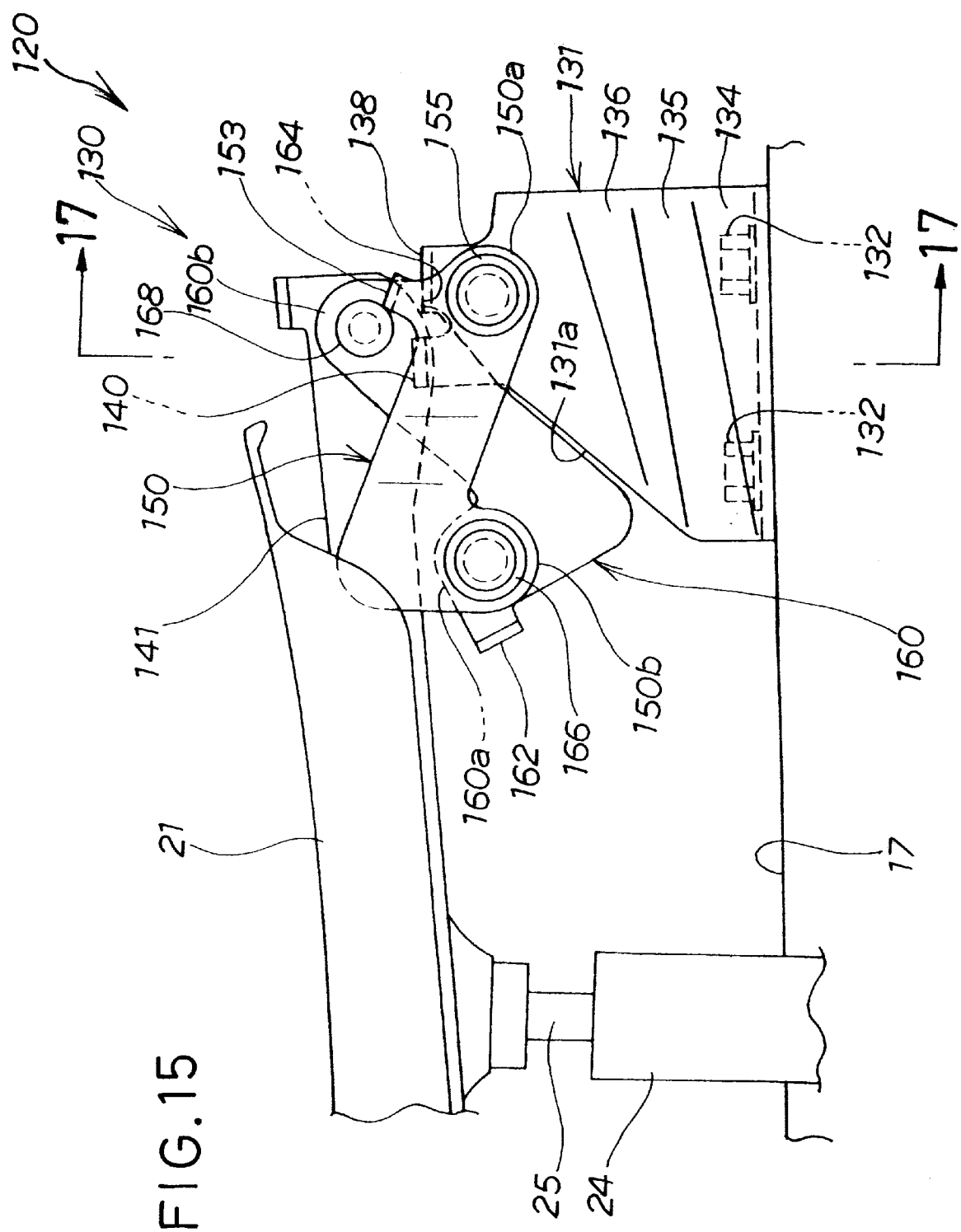
FIG. 15 is a side view of the vehicular hood device according to the fourth embodiment of the present invention.

FIG. 15 shows the vehicular hood device 120 of the fourth embodiment of the invention, as viewed from the side thereof. The hinge means 130 of the vehicular hood device 120 is structured with a lower bracket 131 attached to the vehicle frame 17 and an upper bracket 141 attached at the rear end of the hood 21, thereby bridging a first link 150 and second link 160 between the upper bracket 141 and the lower bracket 131.

Hereunder, the hinge means 130 will be described concretely. In the hinge means 130, the first link 150 at a lower end 150a is attached swingably to the lower bracket 131 through a pin 155. The second link 160 at a lower end 160a is attached swingably to an upper end 150b of the first link 150 through a couple pin 166. The second link 160 at an upper end 160b is attached to the upper bracket 141 through a hinge pin 168.

In the hinge means 130, in a usual situation a rest portion 164 of the second link 160 is rested on a first stopper 138 of the lower bracket 131 (i.e. in the state the first link 150 and the second link 160 are folded). The hood 21 is opened and closed about the hinge pin 168 as a hinge center connecting between the second link 160 and the hood 21. In the event of a collision of the vehicle 110 against an obstacle 18 shown in FIG. 14, the hood 21 is lifted by the action of the actuator 24 wherein a lift position of the hood 21 is determined by the extended first and second links 150, 160. Thus, the hinge serves also as a couple-link mechanism.

In addition, the hinge means 130 has, on the first link 150, a first link stopper 153 to prevent the first link 150 from inclining rearward of the vehicle after extension of the first and second links 150, 160 by the action of the actuator 24 and, on the second link 160, a second link stopper 162 to engage the second link 160 with the first link 150 upon inclining of the second link 160 frontward of the vehicle.

Figure 16:
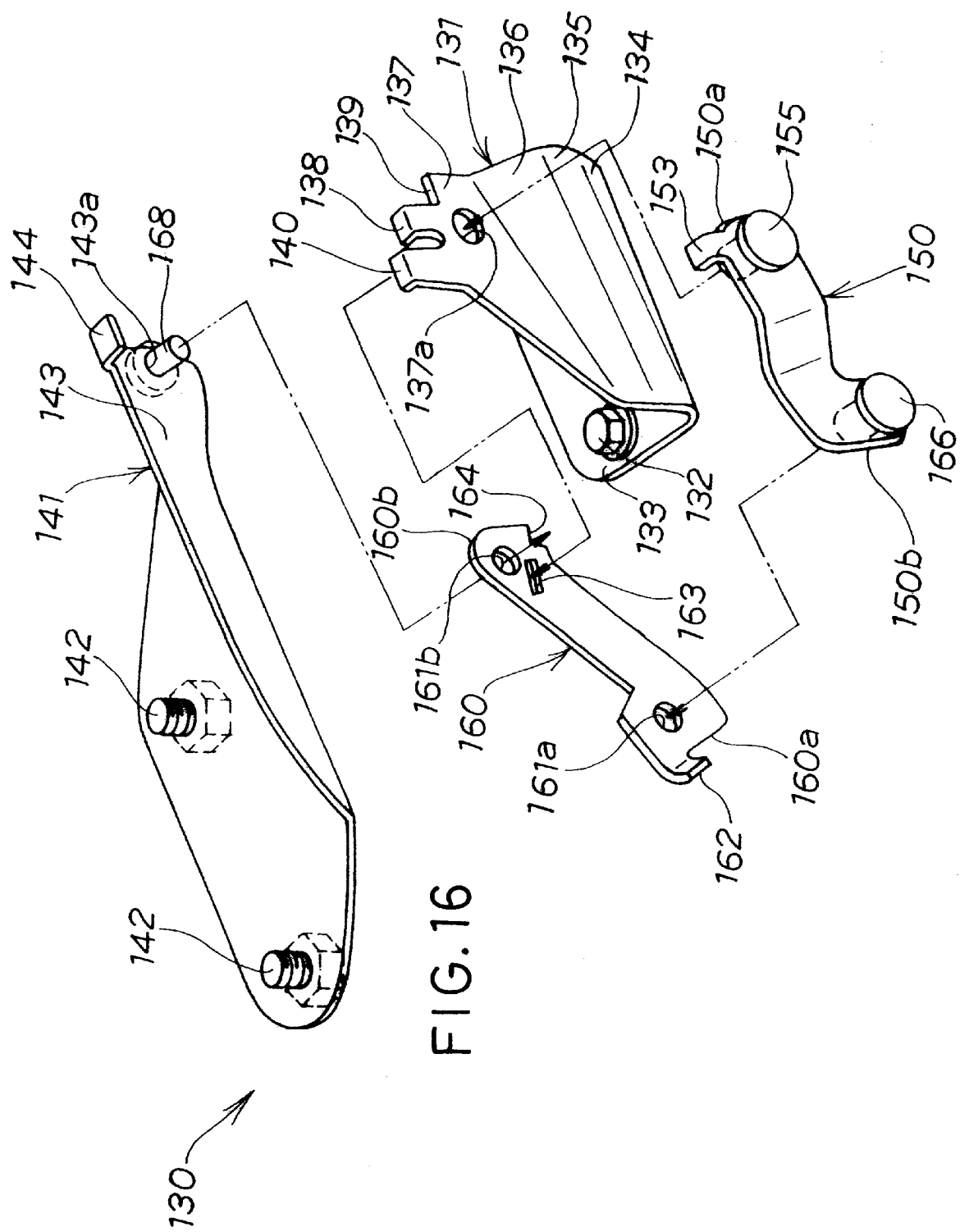
FIG. 16 is an exploded perspective view showing hinge means forming part of the vehicular hood device according to the fourth embodiment of the present invention.

FIG. 16 shows the hinge means 130 of the fourth embodiment according to the invention, in an exploded perspective state. The lower bracket 131 of the hinge means 130 comprises a seat 133 for mounting to the vehicle frame 17 (shown in FIG. 15) through bolts 132, 132 (only one shown), a first bend portion 134 obliquely upwardly extending toward an outside direction of the vehicle frame 17 from the seat 133, a second bend portion 135 vertically raised from the first bend portion 134, a third bend portion 136 obliquely upwardly extending toward an inside direction of the vehicle frame 17 from the second bend portion 135, a fourth bend portion 137 generally in a trapezoidal form vertically raised from the third bend portion 136, a first stopper 138 upwardly extending from an upper end of the fourth bend portion 137 and bent toward an inner side of the vehicular body, a second stopper 139 adjacent the first stopper 138 and a stopper pawl 140 upwardly extending from a top end of the fourth bend portion 137 and bent toward the inner side of the vehicle frame 17.

The fourth bend portion 137 has a hole 137a for insertion of a pin 155.

The upper bracket 41 is a member formed generally in an L form in order for mounting onto a back surface of the hood 121 (shown in FIG. 15) through bolts 142, 142. This has a hole 143a formed at the rear of a vertical portion 143 to insert a hinge pin 168 and a second opening-prevention stopper 144 formed by bending in the vicinity of the hole 143a.

The first link 150 is a member formed generally in an L form as shown in FIG. 15. This has a lower hole in a lower end 150a to insert a pin 155, a link stopper 153, and an upper hole in an upper end 150b to insert a coupling pin 166.

The second link 160 is a member formed generally in an L form as shown in FIG. 15. This has a lower hole 161a opened in a lower end 160a to insert the coupling pin 166. A second link stopper 162 is provided in the vicinity of the lower hole 161a, while an upper hole 161b is opened in an upper end 160b to insert the hinge pin 168. A stopper hole 163 is opened in the vicinity of the upper hole 161b to insert a stopper pawl 140. A rest portion 164 is provided in the vicinity of the stopper hole 163 to rest on the first stopper 138 of the lower bracket 131.

Incidentally, the roles of stoppers 138, 139, 144 and first and second link stoppers 153, 162 will be explained in detail in FIG. 18 to FIG. 26.

Next, one example of an assembling procedure of the hinge means 130 is explained with reference to FIG. 16. First, the lower bracket 131 is mounted to the vehicle frame 17 (shown in FIG. 15) by bolts 132, 132. The pin 155 is inserted in the lower hole of the first link 150. This pin 155 is inserted and crimped in the hole 137a of the lower bracket 131. This attaches the first link 150 for swinging with respect to the lower bracket 131.

Next, the hinge pin 168 is inserted in the hole 143a of the upper bracket 141. The hinge pin 168 is inserted and crimped in the upper hole 161b of the second link 160. This attaches the second link 160 for swinging with respect to the upper bracket 141.

Next, the stopper pawl 140 is inserted in the stopper hole 163 of the second link 160. The first link 150 and the second link 160 are coupled together by the coupling pin 166 and then the coupling pin 166 is crimped. This couples the first link 150 and the second link 160, for swinging relative to each other, and the second link 160 is connected to the lower bracket 131 by the stopper pawl 140.

In the state where the first and second link 150, 160 and the upper bracket 141 are assembled on the lower bracket 131 in this manner, the lower bracket 131 is mounted to the vehicle frame 17 (shown in FIG. 2) by bolts 132, 132.

Finally, the upper bracket 141 is attached to the hood 21 (shown in FIG. 15) by bolts 142, 142. This completes the assembling of the hinge means 30 of FIG. 15, i.e. the state in which the first and second links 150, 160 are folded.

The hinge means 130, in a folded state of the first and second links 150, 160 as shown in FIG. 15, can be positioned such that the rest portion 164 of the second link 160 is rested on the first stopper 138 of the lower bracket 131. This restricts the second link 160 from moving downward by the first stopper 138, thereby making it possible to support the hood 21 in a stable state.

Also, the hinge means 130 has a stopper pawl 140 in the lower bracket 131 to connect (engage) the second link 160 to the lower bracket 131 in the state in which the first and second links 150, 160 are folded, as shown in FIG. 15. The stopper pawl 140 is released from coupling and disengaged from the second link 160 when the actuator 24 is operated but has rigidity maintaining the coupled state with a usual hood opening/closing force, thus preventing the hood 21 from being floated in a usual situation.

Furthermore, by arranging the second link 160 along the slant portion 131a of the lower bracket 131 as shown in FIG. 15, the second link 160 can be inclined downward in a forward direction of the vehicle. Due to this, the lower bracket 131 at its pin 155 attaching position can be set in a comparatively high position with respect to the vehicle frame 17 (shown in FIG. 15).

Due to this, the form of the lower bracket 131 can be determined such that the hood 21 is ready to be crushed in the event an obstacle hits against the same. Incidentally, the form of the lower bracket 131 will be explained in detail in FIG. 17.

FIG. 17 shows a section on line 17—17 in FIG. 15. As shown in the figure, the lower bracket 131 is a member formed, for example, a mild steel having a second bend portion 135, a third bend portion 136 and a fourth bend portion 137 that is bent generally in a squared-U form that is ready to be crushed. Consequently, when the lower bracket 131 is loaded from above, impact can be absorbed due to crushing the second bend portion 135, the third bend portion 136 and the fourth bend portion 137.

Also, shown is a state where the first link 150 is attached to the forth bend portion 137 of the lower bracket 131 through the pin 155, the stopper pawl 140 of the lower bracket 131 is inserted in the stopper hole 163 of the second link 160, and the second link 160 is attached to the upper bracket 141 by the hinge pin 168.

The stopper pawl 140 is a member formed of a mild steel similar to the lower bracket 131. This is a member having rigidity set such that it can keep a coupled state of inserted in the stopper hole 163 during usual force opening/closing the hood or usual vehicle traveling but is deformed for disengagement from the stopper hole 163 upon operation of the actuator 24.

Due to this, by connecting the second link 160 to the lower bracket 131 by the stopper pawl 140, i.e. inserting the stopper pawl 140 in the stopper hole 163, the first and second links 150, 160 are prevented from extending and hence the hood 21 is prevented from being floated in the usual situation.

The mere provision of the stopper pawl 140 makes it possible to prevent against, for example, the chatter due to floating-up of the hood 21 during traveling of the vehicle.

On the other hand, the stopper pawl 140, upon operation of the actuator 24 (shown in FIG. 15), is deformed by a lift force of the actuator 24 and disengaged from the stopper hole 163 of the second link 160. Thus, it is possible to omit the prior-art operation mechanism for unlocking. This further reduces the number of parts.

Figure 18A:
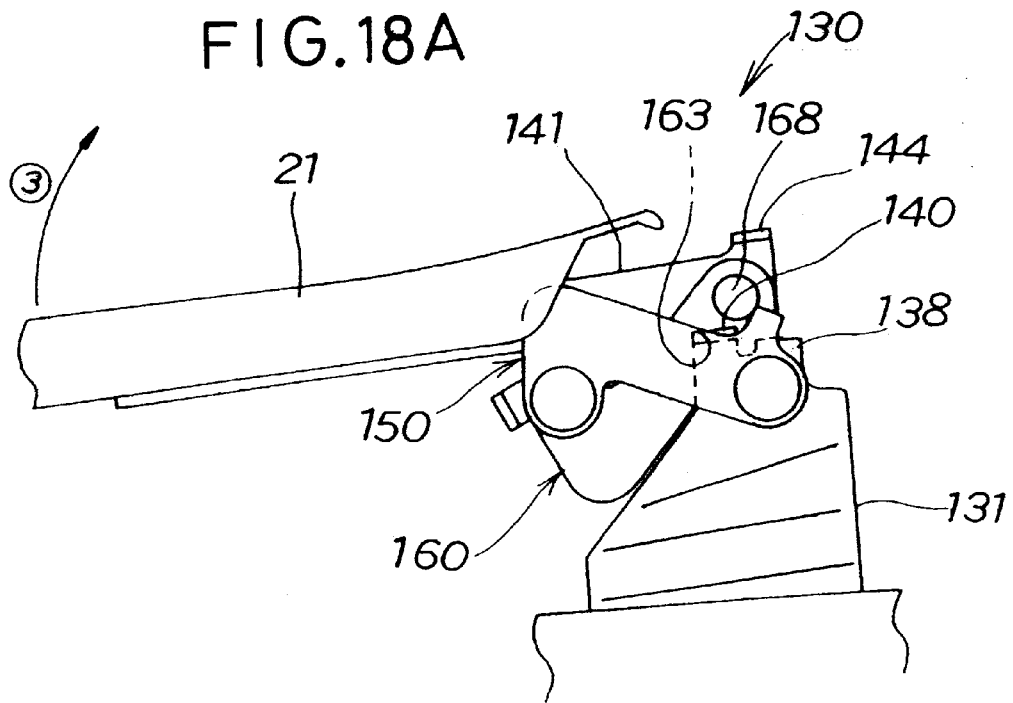
FIGS. 18A and 18B are schematic side views showing an operation of the vehicular hood device according to the fourth embodiment, with the hood opened about the hinge pin as an axis at a rear end side thereof to its full open position and abutted against the first and second opening-prevention stoppers.
Figure 18B:
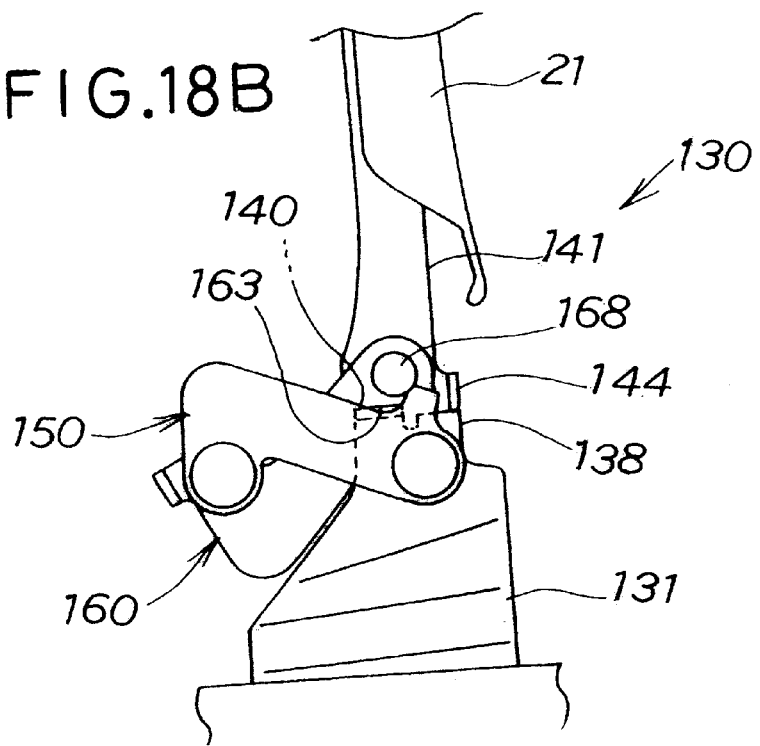

Next, explanation is made of an example for opening the hood in order for repair and inspection in the engine compartment in the fourth embodiment shown in FIGS. 18A and 18B. In FIG. 18A, the stopper pawl 140 is inserted in the stopper hole 163 thereby keeping the first and second links 150, 160 in the folded state. In this state, the hood lock mechanism 22 (shown in FIG. 14) in front of the hood 21 is released to open the hood 21 about the hinge pin 168 as an axis at the rear of the hood 21, as shown at an arrow (3).

In FIG. 18B, by opening the hood 21 up to its full open position, the stopper 144 of the upper bracket 141 abuts against the first stopper 138 of the lower bracket 131 thus restricting the hood 21 from opening. In this case, a force acts to rotate the second link 160 clockwise about the hinge pin 168 as an axis. However, the insertion of the stopper pawl 140 in the stopper hole 163 prevents the second link 160 from rotating.

The opening of the hood 21 allows for maintenance and inspection of the apparatus in the engine compartment from above.

Next, explanation is made on the action where the vehicle collides against an obstacle, with reference to FIG. 14, FIG. 17 and FIG. 19 to FIG. 21.

Referring back to FIG. 14, when the vehicle 110 in traveling collides against the obstacle 18, the bumper sensor 26 detects a collision so that the sensor 26 transmits a detection signal to the control section 29. The control section 29 delivers a drive signal to the actuator 24 so that a gas pressure exerts on the actuator 24 to project the rod 25 therefrom. The action of gas pressure upon the rod 25 of the actuator 24 causes the rod 25 to instantaneously rise due to the gas pressure and applies a lift force F1 to the hood 21 as shown at an arrow.

Next, by applying a lift force F1 to the hood 21 as shown in FIG. 17, a lift-up force F4 is applied to the stopper pawl 140 through the upper bracket 141, hinge pin 168 and stopper hole 163 of second link 160.

This deforms the stopper pawl 140 so as to expand and disengage from the stopper hole 163.

Figure 19A:
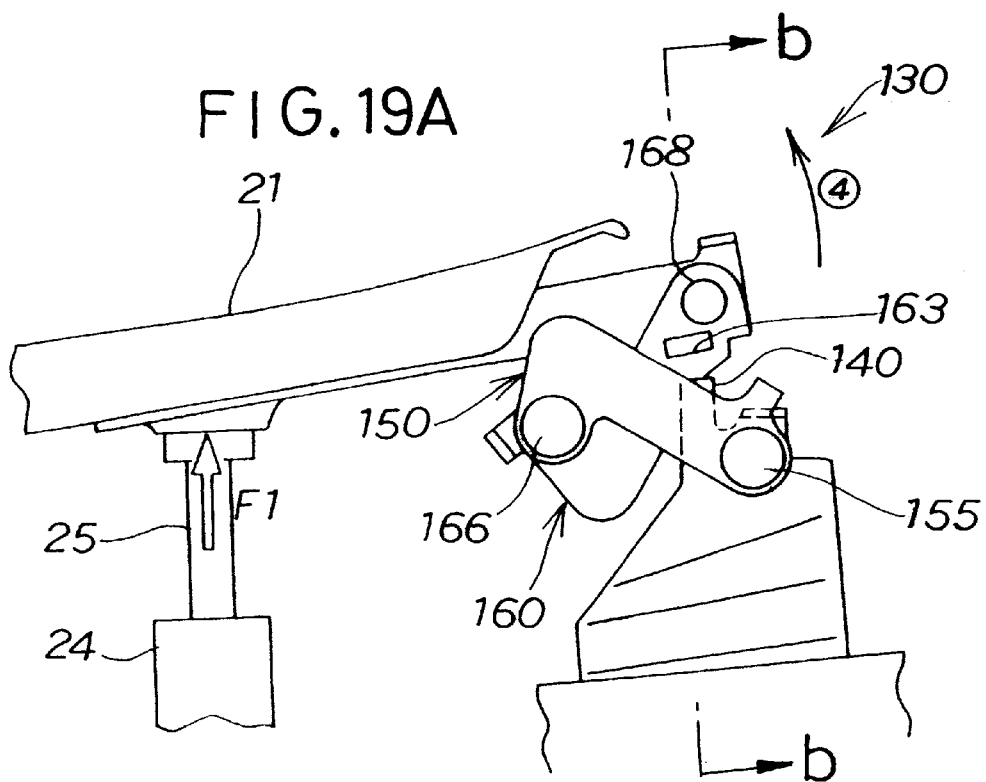
FIGS. 19A and 19B are schematic side views showing an operation of the vehicular hood device according to the fourth embodiment, with a stopper pawl disengaged from a stopper hole to cause the first and second links to swing.

In FIG. 19A, by the disengagement of the stopper pawl 140 from the stopper hole 163, the second link 160 swings counterclockwise about the coupling pin 166 as an axis. Simultaneously, the first link 150 swings clockwise about the pin 155 as an axis.

Accordingly, by starting the extension of the first and second links 150, 160, the hood 21 is lifted about the hood lock mechanism 22 (shown in FIG. 14) as an axis, as shown at an arrow (4).

Figure 19B:
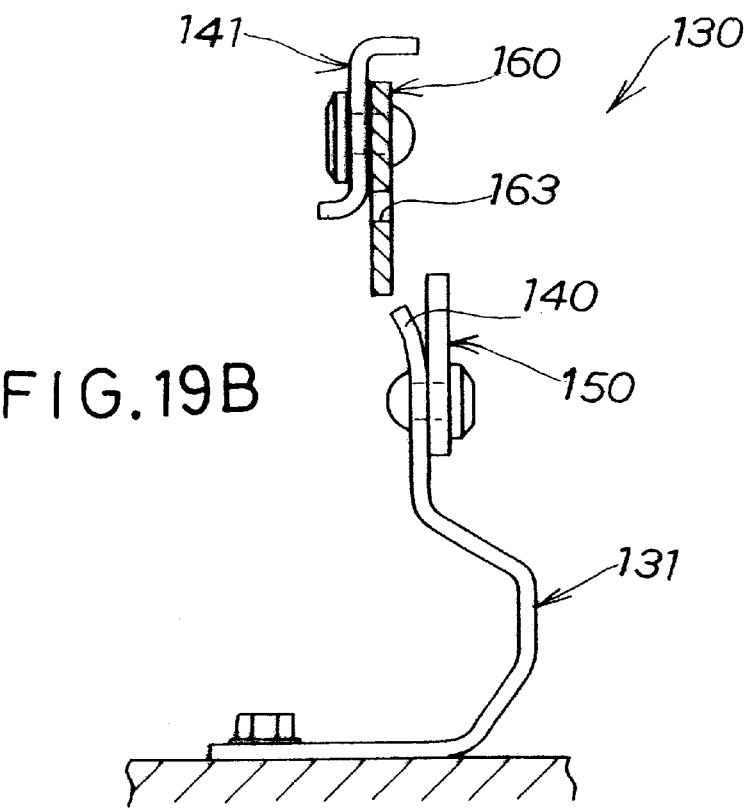

FIG. 19B shows a section on line b—b in FIG. 19A. In FIG. 19B, the stopper pawl 140 is deformed by expansion to the above, disengaging from the stopper hole 163.

Figure 20A:
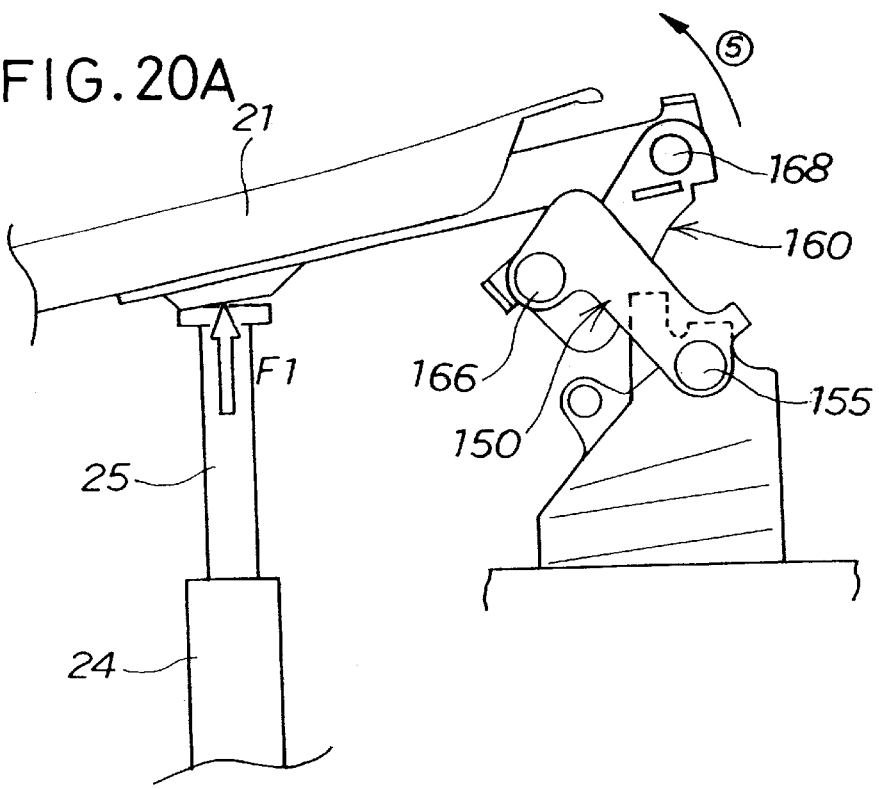
FIGS. 20A and 20B are schematic side views showing an operation of the vehicular hood device according to the fourth embodiment, with the first and second links swung to thereby extend the first and second links to hold the hood stationary at the upper limit position.

In FIG. 20A, the hood 21 is continuously lifted up as shown at an arrow (5) by a lift-up force F1 of the rod 25 of the actuator 24. The rise of the hinge pin 168 places the first and second links 150, 160 into a state of extension midway.

Figure 20B:
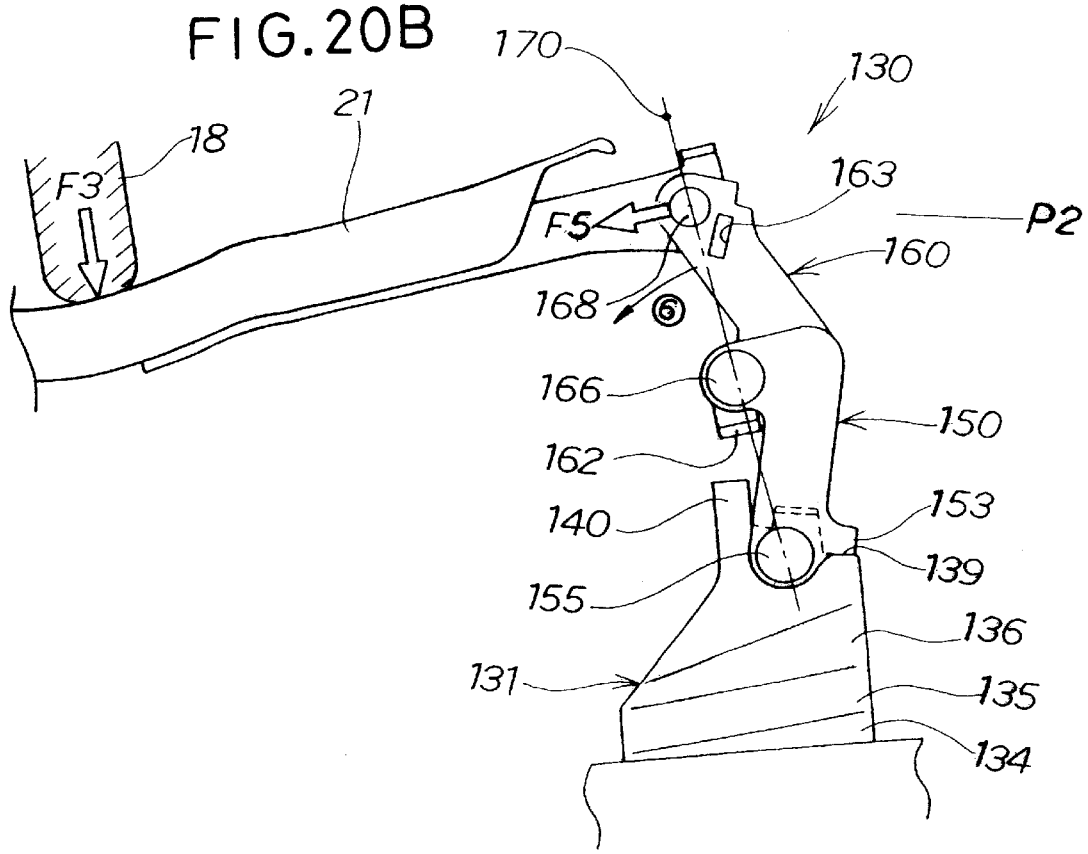

In FIG. 20B, by completely extending the first and second links 150, 160, the pin 155, the coupling pin 166 and the hinge pin 168 are positioned on a straight line 170. Due to this, the hood 21 is restricted from rising by the first and second links 150, 160 to position the hood 21 stationary at an upper limit P2 position.

After halting the hood 21, the weight of the hood 21 acts to close the hood. Consequently, the weight of the hood 21 acts upon the first and second links 150, 160 in a manner folding the first and second links 150, 160.

However, because of the pin 155, the coupling pin 166 and the hinge pin 168 positioned on the straight line 170, the first and second links 150, 160 will not be folded by the weight of the hood 21. Thus, the hood 21 can be kept at the upper limit position P2 by the first and second links 150, 160.

In the state the hood 21 is held at the upper limit position P2, if the obstacle 18 falls onto the hood 21, an external force F3 acts upon it as shown at an arrow, thus causing a dent in the hood 21. This pulls the rear end of the hood 21 toward the front of the vehicle, thereby applying an external force F5 to the hinge pin 168 as shown at an arrow. Accordingly, the second link 160 is inclined toward the front of the vehicle about the coupling pin 166 as an axis, as shown at an arrow (6).

At this time, the second link stopper 162 of the second link 160 is abutted against the first link 150 thereby engaging the second link 160 with the first link 150. Consequently, the second link 160 is prevented from inclining toward the front of the vehicle thereby holding the hood 21 at the upper limit position P2.

Meanwhile, where a force is applied to incline the first link 150 toward the rear of the vehicle about the pin 155 as an axis, the first link 150 can be prevented from inclining toward the rear of the vehicle by abutting the first link stopper 153 of the first link 150 against the second stopper 139 of the lower bracket 131.

When the hood 21 is lifted by extending the first and second links 150, 160, the pin 155, the coupling pin 166 and the hinge pin 168 are positioned on the straight line 170 thereby preventing the first and second links 150, 160 from being folded by the weight of the hood 21.

In addition, in the event the obstacle 18 falls onto the hood 21, the second link stopper 162 prevents the second link 160 from inclining toward the front of the vehicle. Thus, the first and second links 150, 160 are prevented from being folded to hold the lifted hood 21 at the upper limit position P2. In this manner, the mere provision of the second link stopper 162 holds the hood 21 at a raised position thus simplifying the structure of the mechanism for holding the hood 21.

Meanwhile, the first and second link stoppers 153, 162 can be integrally formed with the first and second links 150, 160, thus simplifying the forming and shortening the forming time. In addition, because the first and second link stoppers 153, 162 are integrally formed with the first and second links 150, 160, it is possible to eliminate the assembling of the first and second link stoppers 153, 162.

Figure 21:
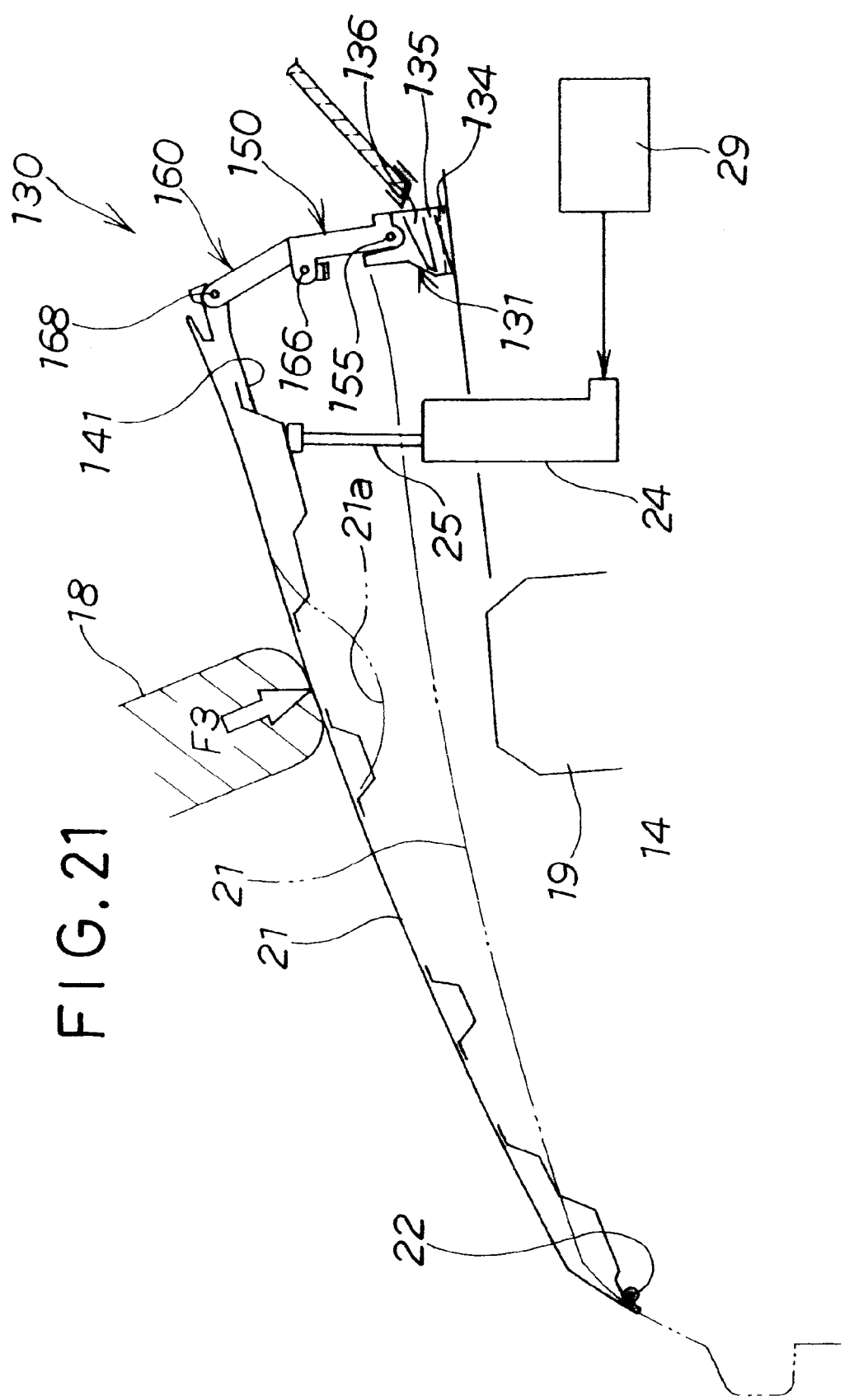
FIG. 21 is a schematic side view showing an operation of the vehicular hood device according to the fourth embodiment, with an obstacle falling onto the hood placed at the upper limit position.

As shown in FIG. 21, by lifting the hood 21 by a predetermined amount from a position shown at an imaginary line to a position shown at a solid line, it is possible to increase the distance from the hood 21 to the apparatus 19, such as the engine, accommodated in the engine compartment 14. Therefore, the hood 21 can be secured with a sufficient amount of downward deforming.

Consequently, even if the obstacle 18 falls onto the hood 21 to apply an external force F3 as shown at the arrow, a dent region 21a can be secured broadly as shown at an imaginary line in the hood 21. Hence, the impact exerted by the obstacle 18 can be absorbed positively.

In addition, as shown in FIG. 17 the lower bracket 131 at its second bend portion 135, third bend portion 136 and fourth bend portion 137 is bent generally in a squared-U shape that is a form ready to be crushed. Accordingly, in the event that the obstacle 18 falls onto the hood 21 to apply an external force F3 as shown at the arrow, the impact can be absorbed by crushing the second bend portion 135, third bend portion 136 and fourth bend portion 137. Hence, the impact exerted by the obstacle 18 can be absorbed further positively.

Meanwhile, if the amount of dent in the hood 21 is broadened as shown at the imaginary line, the dent 21a will not interfere with the apparatus 19 in the engine compartment thus protecting the apparatus 19 from the obstacle 18.

Figure 22:
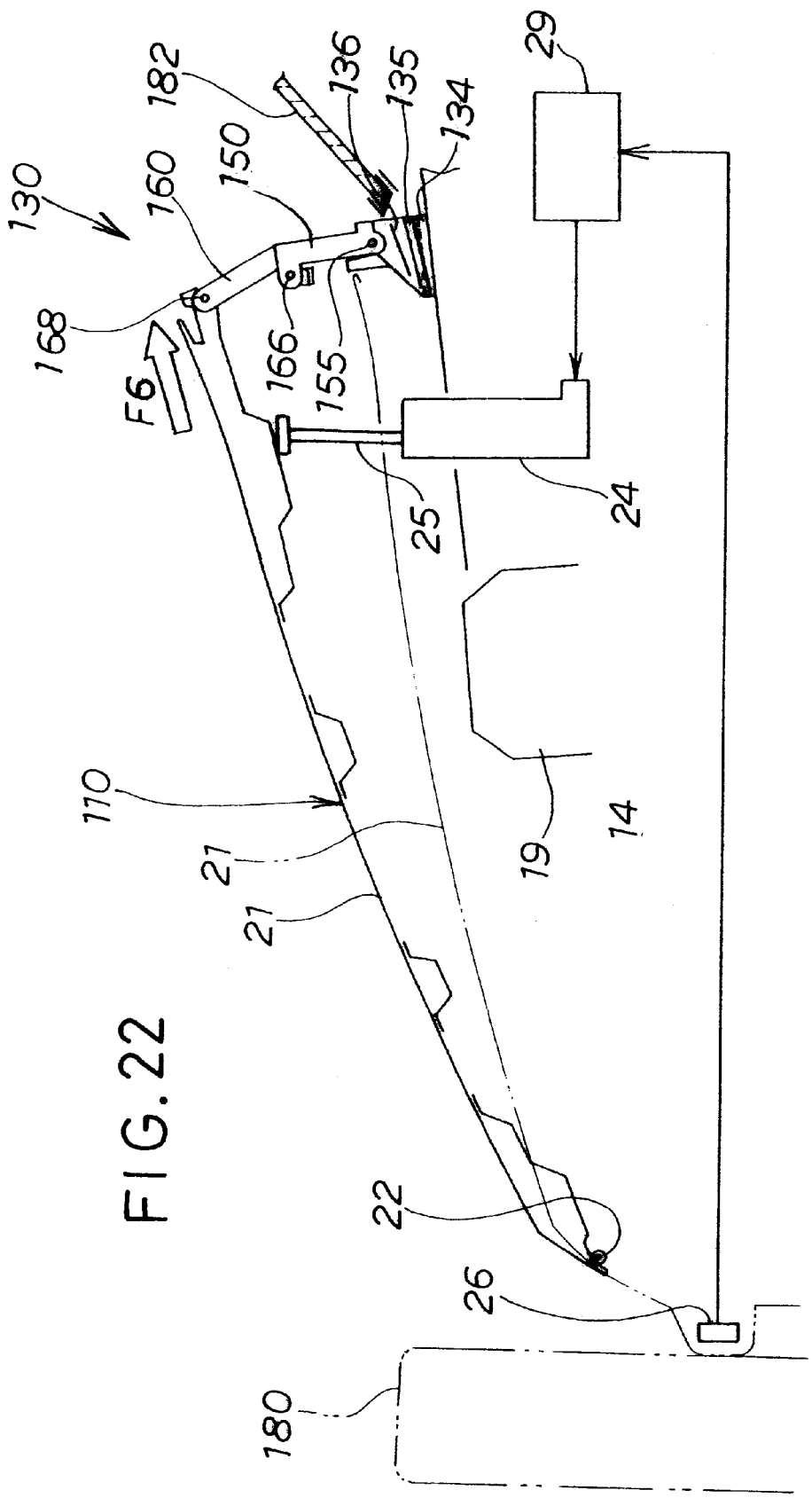
FIG. 22 is a schematic side view showing an operation of the vehicular hood device according to the fourth embodiment, the vehicle hitting an obstacle with the hood held stationary at its upper limit position.
Figure 23:
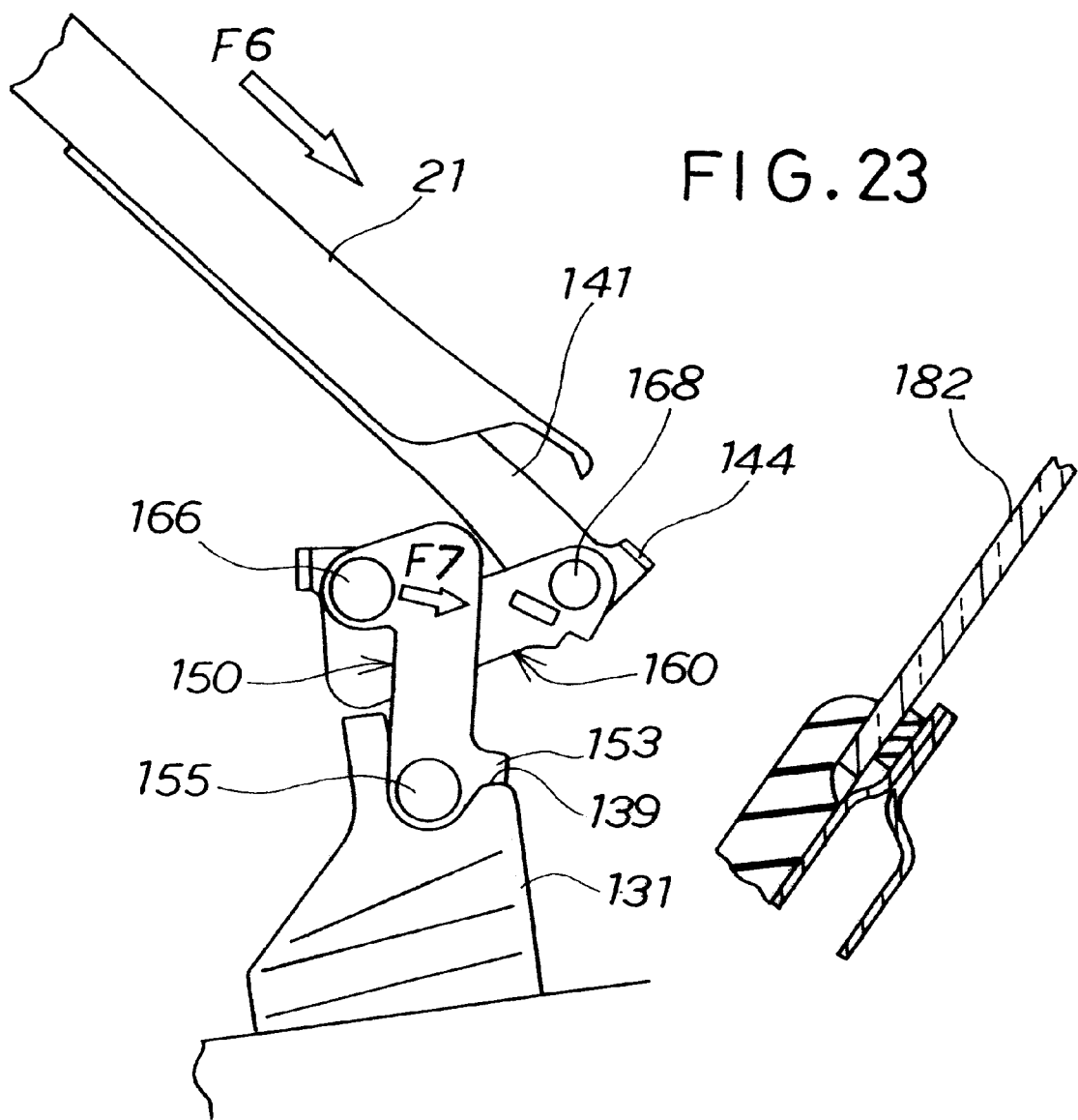
FIG. 23 is a schematic side view showing an operation of the vehicular hood device of the fourth embodiment, with the second link inclined toward the rear of the vehicle about a coupling pin as an axis.
Figure 24:
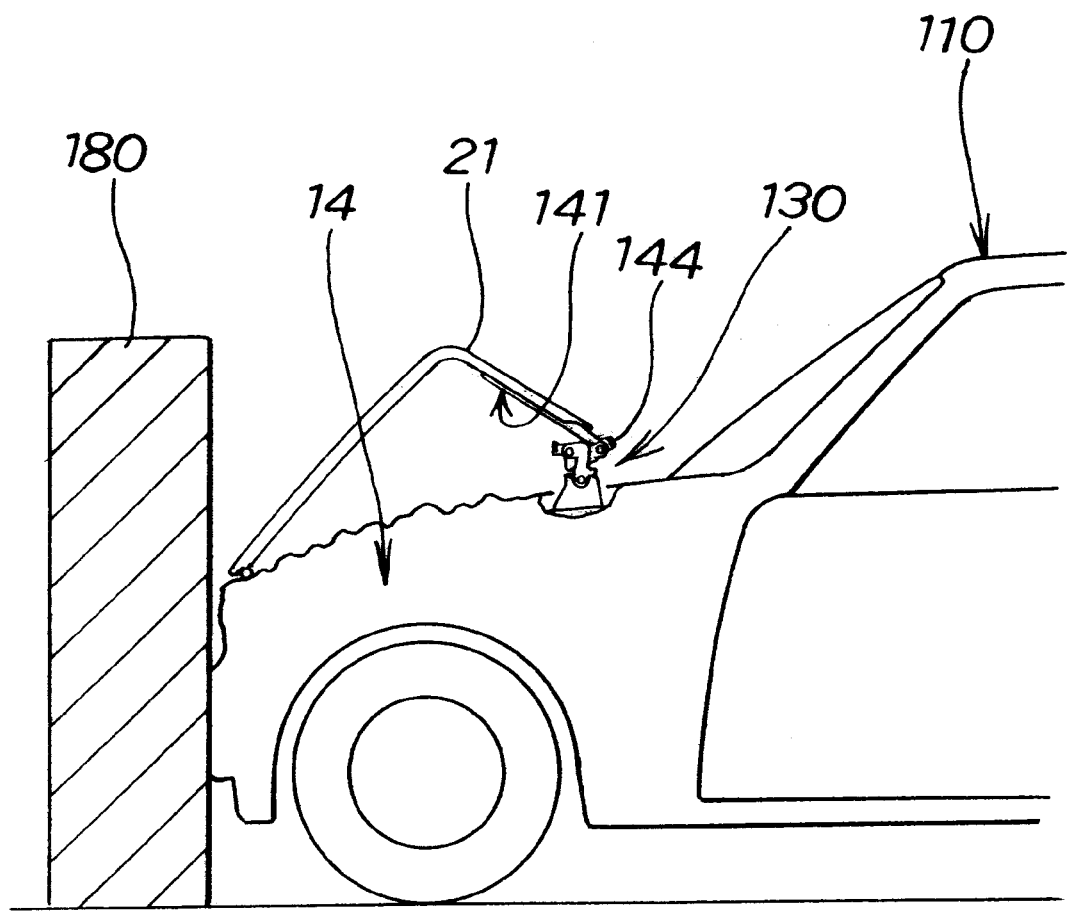
FIG. 24 is a schematic side view illustrating an operation of the vehicular hood device according to the fourth embodiment, with the hood bent at its center and deformed into a hill-shape as a result of collision of the vehicle with an obstacle.
Figure 25:
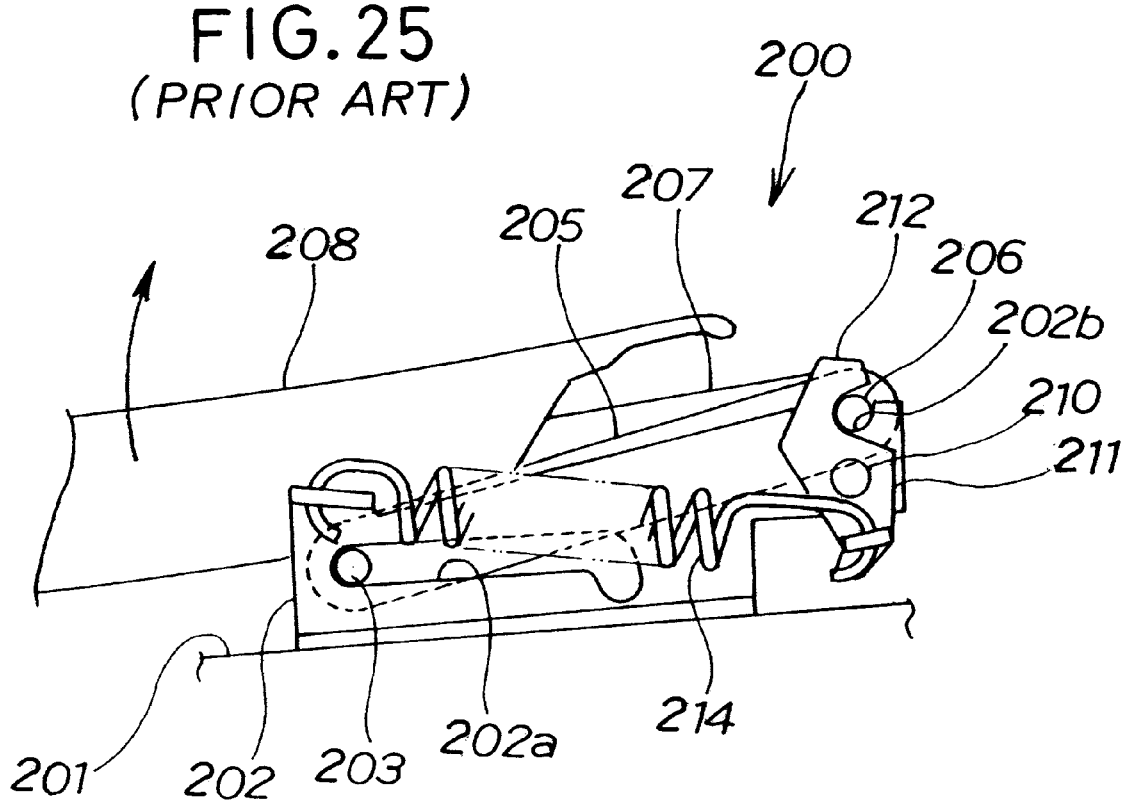
FIG. 25 is a side view showing a conventional vehicular hood device.
Figure 26:
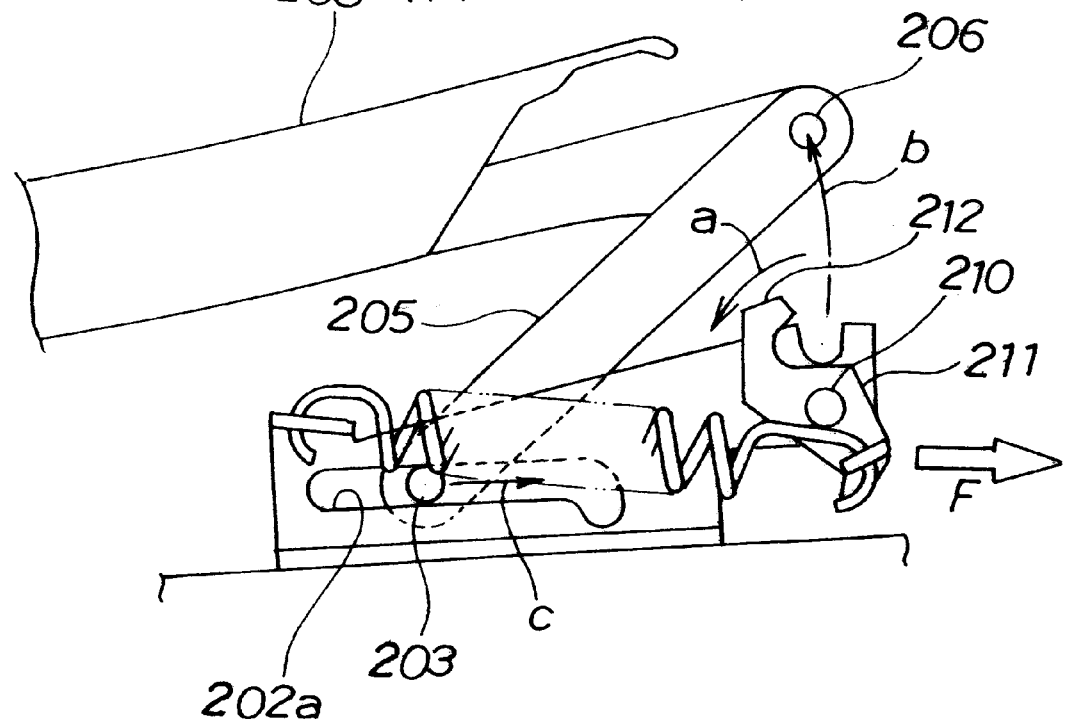
FIG. 26 is a side view showing an operation of the conventional vehicular hood device.
Figure 27A:
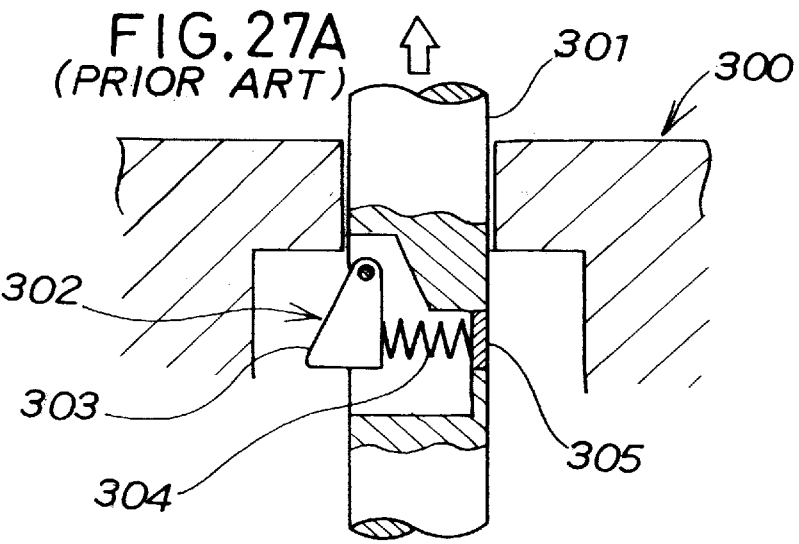
FIGS. 27A, 27B and 27C are schematic views showing an operation of an actuator forming part of the conventional vehicular hood device.
Figure 27B:
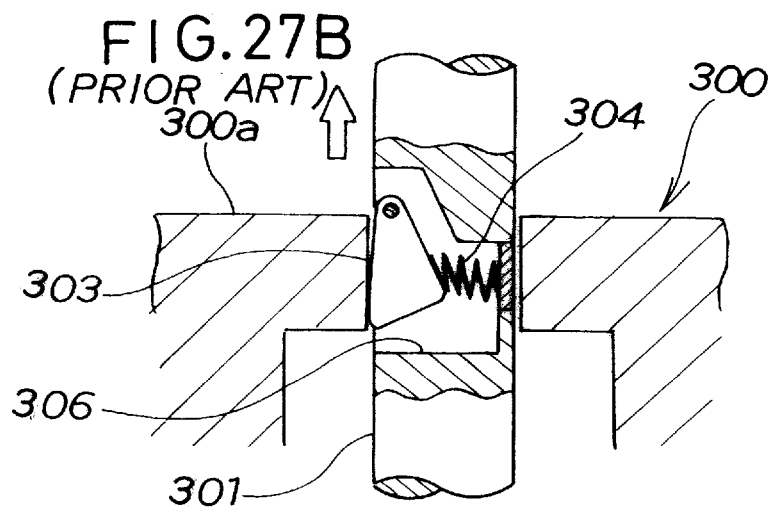
Figure 27C:
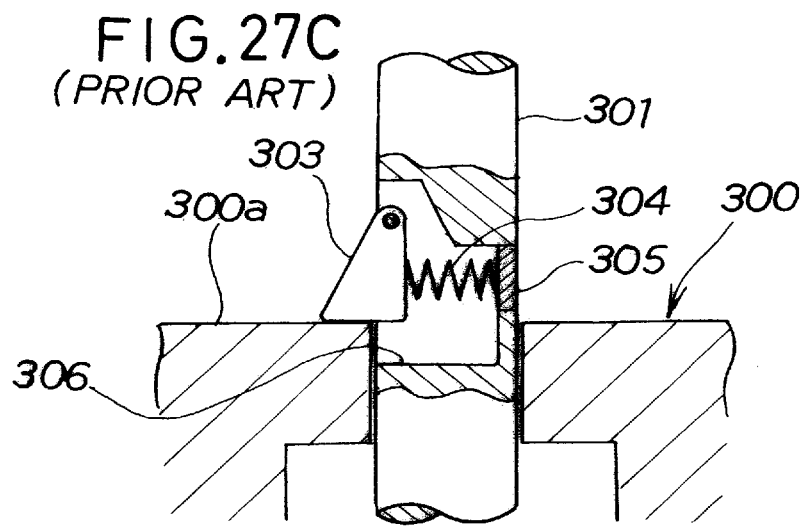

Next, explanation is made of the action of the vehicular hood device 120 upon colliding of the vehicle 110 of the fourth embodiment against a wall or the like, with reference to FIG. 22 to FIG. 24.

FIG. 22 shows that the vehicle 110 of the fourth embodiment collides against a comparatively solid obstacle 180 of a wall or the like. When the vehicle 110 collides against the obstacle 180, the control section 29 transmits a drive signal to the actuator 24 on the basis of a detection signal of the bumper sensor 26 to lift a rear of the hood 21 by the actuator 24. The first and second links 150, 160 extend to position the pin 155, the coupling pin 166 and the hinge pin 168 on a straight line 170 (shown in FIG. 20B). Consequently, the first and second links 150, 160 are prevented from being folded to hold the hood 21 at a lifted position.

At this time, the engine compartment 14 of the vehicle 110 is deformed to push the hood 21 toward the rear of the vehicle, causing a force F6 to incline the second link 160 toward the rear of the vehicle about the coupling pin 166 as an axis.

In FIG. 23, the external force F6 is applied to the second link 160 thereby inclining the second link 160 toward the rear of the vehicle about the coupling pin 166 as an axis.

Next, a force F7 is applied to the coupling pin 166 to incline the first link 150 toward the rear of the vehicle about the pin 155 as an axis. At this time, because the first link stopper 153 of the first link 150 is in abutment against the second stopper 139 of the lower bracket 131, the first link 150 can be prevented from inclining toward the rear of the vehicle.

Accordingly, it is possible to restrict a tip of the upper bracket 141 attached to the hood 21, i.e. the stopper 144, from moving toward the rear of the vehicle. Thus, the stopper 144 of the upper bracket 141 will not approach the front windshield 182 by a required amount or greater.

After extending the first and second links 150, 160, the first link 150 is prevented by the first link stopper 153 from inclining toward the rear of the vehicle. Accordingly, the hood 21 while lifted is held so as not to move toward the rear of the vehicle by the first link 150 whereby the hood 21 at its rear end, i.e. the stopper 144 of the upper bracket 141, can be prevented from moving toward the front windshield 182 by a required amount or greater.

In this manner, the mere provision of the first stopper 153 for abutment against the second stopper 139 of the lower bracket 131 can prevent the rear end of the hood 21 from moving toward the front windshield 182 by a required amount or greater.

In FIG. 24, by restricting the stopper 144 of the upper bracket 141 from moving toward the rear of the vehicle and by deformation of the engine compartment 14 in the vehicle 110, the hood 21 at its center is raised and deformed into a mountain form. In this manner, when the vehicle 110 collides against the obstacle 180, the engine compartment 14 or hood 21 deforms thereby absorbing an impact force due to collision.

Incidentally, although the foregoing first embodiment explained in the example as having the protuberance 39 in the inclination portion of the lower bracket 31 and a stopper pin 40 on the protuberance 39, the arrangement position of the stopper pin 40 may be set arbitrarily.

Also, although the first embodiment explained in the example that the stopper pin 40 was inserted in the stopper hole 63 of the second link 60 as means for connecting the second link 60 to the lower bracket 31, the stopper pin 40 may be inserted in both link stopper holes of the first link 50 and the second link 60.

Furthermore, although the first embodiment explained in the example that the lower bracket 31, 131 was formed of a mild steel, the material is not limited to that.

The first opening-prevention stopper 38a, 83 and the second opening-prevention stopper 44, 93 explained in the first to third embodiment are not limited to the forms explained in the first to third embodiment but may be formed in other forms.

Meanwhile, although the fourth embodiment explained in the example that the first link stopper 153 was provided on the first link 150, the first link stopper 153 is satisfactorily provided between the first link 150 and the lower bracket 131. The first link stopper 153 may be provided on the lower bracket 131.

Furthermore, although the fourth embodiment explained in the example that the second link stopper 162 was provided on the second link 160, the second link stopper 162 is satisfactorily provided between the second link 160 and the first link 150. The second link stopper 162 may be provided on the first link 150.

Although, the fourth embodiment explained in the example that the stopper pawl 140 was formed in the upper end of the lower bracket 131, the arrangement position of the stopper pawl 140 may be set arbitrarily.

Also, the fourth embodiment explained in the example that the stopper pawl 140 was inserted in the stopper hole 163 of the second link 160 as means for connecting the second link 160 to the lower bracket 131. However, the stopper pawl 140 can engage an upper side of the second link 160 to connect the second link 160 to the lower bracket 131.

Furthermore, in the fourth embodiment, the stopper pawl 140 may be inserted in both of the first link 150 and second link 160.

Although the fourth embodiment explained in the example that the lower bracket 131 and the stopper pawl 140 are formed of a mild steel, the material is not limited to this.

Also although the first and fourth embodiments were explained in the examples as having the actuators 24 and hinge means 30, 130 arranged each two in number at the left/right side of the vehicle frame 17, the actuators 24 and hinge means 30, 130 may be arranged only at one side of the vehicle frame 17. This reduces the number of parts and further suppresses the mount-up of cost.

Furthermore, although the first and fourth embodiments arranged the actuators 24 on the vehicle frame 17, the actuators 24 may be provided on the hood 21.

Although the first and second embodiments explained in the examples that the hood 21 was lifted by the rod 25 of the actuator 24 until it reaches the upper limit position P1, P2, the hood 21 may jump up to the upper limit position P1, P2 by the rod 25 of the actuator 24. Because the stroke of the rod 25 can be decreased, the actuator 24 can be reduced in size.

Obviously, various minor changes and modifications of the present invention are possible in the light of the above teaching. It is therefore to be understood that within the scope of the appended claims, the invention may be practiced otherwise than as specifically described.

What is claimed is:

1. A vehicular hood device comprising a first link attached swingably to a bracket on a vehicle via a pin, a second link attached swingably to said first link via a coupling pin, and a hood provided at a front part of the vehicle and attached to said second link via a hinge pin, said hood being normally capable of undertaking opening and closing actions about said hinge pin with said first and second links folded, said hood being designed to be lifted, upon collision of the vehicle,with an obstacle, by an action of an actuator, said first and second links being extendible upon the collision to determine a raised position of said hood, characterized in that said vehicular hood device further comprises:

a stopper pawl for coupling said second link to said bracket with said first and second links folded, wherein said stopper pawl is formed integrally with one of said second link and said bracket, and the other of said second link and said bracket has a portion for being locked with said stopper pawl to keep the first and second links in a folded state, wherein said stopper pawl has a rigidity being set to maintain the coupling between said second link and said bracket during the opening and closing actions of said hood and to cause said stopper pawl to undergo deformation to release the coupling between said second link and said bracket upon operation of said actuator.

2. A vehicular hood device according to claim 1, wherein said portion of said other of said second link and said bracket has a stopper hole in which said stopper pawl is inserted when the first and second links are in the folded state.

3. A vehicular hood device according to claim 2, wherein said stopper pawl is formed integrally with said bracket, and said stopper hole is formed in said second link.

4. A vehicular hood device according to claim 1, wherein said stopper pawl normally has a bent shape, and when the first and second links are extended as the hood is lifted up by the action of said actuator, the stopper pawl is deformed into a substantially unbent shape.

5. A vehicular hood device according to claim 2, wherein said stopper pawl normally has a bent shape, and when the first and second links are extended as the hood is lifted up by the action of said actuator, the stopper pawl is deformed into a substantially unbent shape.

6. A vehicular hood device according to claim 3, wherein said stopper pawl normally has a bent shape, and when the first and second links are extended as the hood is lifted up by the action of said actuator, the stopper pawl is deformed into a substantially unbent shape.

7. A vehicular hood device according to claim 2, further including a stopper mechanism acting between said hood and said bracket to prevent said hood from opening beyond a predetermined angle, said stopper mechanism including a first stopper member formed integrally with said hood and a second stopper member formed integrally with said bracket, said first and second stopper members being arranged such that when said hood is opened said predetermined angle, said first and second stopper members abut against each other to prevent said hood from further opening.

8. A vehicular hood device according to claim 7, wherein said portion of said other of said second link and said bracket has a stopper hole in which said stopper pawl is inserted when the first and second links are in the folded state.

9. A vehicular hood device according to claim 8, wherein said stopper pawl is formed integrally with said bracket, and said stopper hole is formed in said second link.

10. A vehicular hood device according to claim 7, wherein said stopper pawl normally has a bent shape, and when the first and second links are extended as the hood is lifted up by the action of said actuator, the stopper pawl is deformed into a substantially unbent shape.

11. A vehicular hood device according to claim 8, wherein said stopper pawl normally has a bent shape, and when the first and second links are extended as the hood is lifted up by the action of said actuator, the stopper pawl is deformed into a substantially unbent shape.

12. A vehicular hood device according to claim 9, wherein said stopper pawl normally has a bent shape, and when the first and second links are extended as the hood is lifted up by the action of said actuator, the stopper pawl is deformed into a substantially unbent shape.

13. A vehicular hood device according to claim 1, further including a first link stopper disposed on one of said first link and said bracket and a second link stopper disposed on one of said second link and said first link, wherein when the hood is subjected to a force tending to lower the hood with said first and second links placed in an extended state, said first link stopper abuts with the other of said first link and said bracket to engage said first link and said bracket together thereby to prevent said first link from inclining toward a rear side of said vehicle and said second link stopper abuts with the other of said second link and said first link to engage said second link and said first link together thereby to prevent said second link from inclining toward a front side of the vehicle.

14. A vehicular hood device according to claim 13, wherein said first link stopper is formed integrally with said first link and said second link stopper is formed integrally with the second link.

15. A vehicular hood device according to claim 13, wherein when the first and second links are in the extended state, said hinge pin, said coupling pin and said pin are disposed on a straight line.

16. A vehicular hood device according to claim 13, wherein said portion of said other of said second link and said bracket has a stopper hole in which said stopper pawl is inserted when the first and second links are in the folded state.

17. A vehicular hood device according to claim 16, wherein said stopper pawl is formed integrally with said bracket, and said stopper hole is formed in sa second link.

18. A vehicular hood device according to claim 13, wherein said stopper pawl normally has a bent shape, and when the first and second links are extended as the hood is lifted up by the action of said actuator, the stopper pawl is deformed into a substantially unbent shape.

19. A vehicular hood device according to claim 16, wherein said stopper pawl normally has a bent shape, and when the first and second links are extended as the hood is lifted up by the action of said actuator, the stopper pawl is deformed into a substantially unbent shape.

20. A vehicular hood device according to claim 17, wherein said stopper pawl normally has a bent shape, and when the first and second links are extended as the hood is lifted up by the action of said actuator, the stopper pawl is deformed into a substantially unbent shape.

21. A vehicular hood device according to claim 7, further including a first link stopper disposed on one of said first link and said bracket and a second link stopper disposed on one of said second link and said first link, wherein when the hood is subjected to a force tending to lower the hood with said first and second links placed in an extended state, said first link stopper abuts with the other of said first link and said bracket to engage said first link and said bracket together thereby to prevent said first link from inclining toward a rear side of said vehicle and said second link stopper abuts with the other of said second link and said first link to engage said second link and said first link together thereby to prevent said second link from inclining toward a front side of the vehicle.

22. A vehicular hood device according to claim 21, wherein said first link stopper in formed integrally with said first link and said second link stopper is formed integrally with the second link.

23. A vehicular hood device according to claim 21, wherein when the first and second links are in the extended state, said hinge pin, said coupling pin and said pin are disposed on a straight line.

24. A vehicular hood device according to claim 21, wherein said portion of said other of said second link and said bracket has a stopper hole in which said stopper pawl is inserted when the first and second links are in the folded state.

25. A vehicular hood device according to claim 24, wherein said stopper pawl is formed integrally with said bracket, and said stopper hole is formed in said second link.

26. A vehicular hood device according to claim 21, wherein said stopper pawl normally has a bent shape, and when the first and second links are extended as the hood is lifted up by the action of said actuator, the stopper pawl is deformed into a substantially unbent shape.

27. A vehicular hood device according to claim 24, wherein said stopper pawl normally has a bent shape, and when the first and second links are extended as the hood is lifted up by the action of said actuator, the stopper pawl is deformed into, a substantially unbent shape.

28. A vehicular hood device according to claim 25, wherein said stopper pawl normally has a bent shape, and when the first and second links are extended as the hood is lifted up by the action of said, actuator, the stopper pawl is deformed into a substantially unbent shape.

* * * * *